(12) United States Patent
Sakhnini et al.

(10) Patent No.: US 11,470,565 B2
(45) Date of Patent: Oct. 11, 2022

(54) PERIODIC LEAN SYNCHRONIZATION SIGNAL DESIGN

(71) Applicant: QUALCOMM incorporated, San Diego, CA (US)

(72) Inventors: Iyab Issam Sakhnini, San Diego, CA (US); Tao Luo, San Diego, CA (US); Wooseok Nam, San Diego, CA (US); Hwan Joon Kwon, San Diego, CA (US); Yan Zhou, San Diego, CA (US); Linhai He, San Diego, CA (US); Yuchul Kim, San Diego, CA (US); Jelena Damnjanovic, Del Mar, CA (US); Juan Montojo, San Diego, CA (US); Peter Gaal, San Diego, CA (US); Olufunmilola Omolade Awoniyi-Oteri, San Diego, CA (US); Mahmoud Taherzadeh Boroujeni, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 59 days.

(21) Appl. No.: 17/188,895

(22) Filed: Mar. 1, 2021

(65) Prior Publication Data
US 2021/0321342 A1    Oct. 14, 2021

Related U.S. Application Data

(60) Provisional application No. 63/008,210, filed on Apr. 10, 2020.

(51) Int. Cl.
*H04W 56/00* (2009.01)
*H04W 76/20* (2018.01)
*H04W 76/10* (2018.01)

(52) U.S. Cl.
CPC ......... *H04W 56/001* (2013.01); *H04W 76/10* (2018.02); *H04W 76/20* (2018.02)

(58) Field of Classification Search
CPC ... H04W 56/001; H04W 76/10; H04W 76/20; H04L 5/005; H04L 5/0053
See application file for complete search history.

(56) References Cited

U.S. PATENT DOCUMENTS

2021/0235513 A1* 7/2021 Kim .................. H04W 74/0891
2022/0029761 A1* 1/2022 Su ......................... H04L 5/0091

* cited by examiner

*Primary Examiner* — Kyaw Z Soe
(74) *Attorney, Agent, or Firm* — Holland & Hart LLP

(57) ABSTRACT

Methods, systems, and devices for wireless communications are described. A user equipment (UE) may establish a connection with a base station based at least in part on a synchronization signal block from the base station, wherein the synchronization signal block comprises at least a first synchronization signal. The UE may identify a configuration for a transmission pattern for the first synchronization signal to be transmitted by the base station. The UE may receive one or more instances of the first synchronization signal according to the transmission pattern for the first synchronization signal. The UE may modify the established connection with the base station based at least in part on the received one or more instances of the first synchronization signal.

30 Claims, 19 Drawing Sheets

… (US 11,470,565 B2)

PERIODIC LEAN SYNCHRONIZATION SIGNAL DESIGN

CROSS REFERENCE

The present Application for Patent claims the benefit of U.S. Provisional Patent Application No. 63/008,210 by SAKHNINI et al., entitled "PERIODIC LEAN SYNCHRONIZATION SIGNAL DESIGN," filed Apr. 10, 2020, assigned to the assignee hereof, and expressly incorporated by reference herein.

FIELD OF TECHNOLOGY

The following relates generally to wireless communications and more specifically to periodic lean synchronization signal design.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may perform a synchronization procedure during initial access to establish a connection via a channel. The UE may receive synchronization signals and system information from a base station. However, the UE may perform a number of steps before receiving the system information. For example, a UE may receive and decode a synchronization signal block (SSB), a master information block (MIB), a set of control resources, a downlink control channel, and a downlink shared channel to receive the system information. In some cases, some synchronization steps may be a computation burden on the UE, and conventional techniques for synchronization may have limitations for different types of devices including devices employing coverage enhancement or reduced computational complexity.

SUMMARY

The described techniques relate to improved methods, systems, devices, and apparatuses that support periodic lean synchronization signal design. Generally, the described techniques provide for a lean synchronization signal block (SSB) design (e.g., for a subset of signals in an SSB). For example, an SSB (e.g., used when initially establishing a connection) may include a primary synchronization signal (PSS), a secondary synchronization signal (SSS), and a physical broadcast channel (PBCH). According to the techniques described herein, a lean SSB may include one of either a PSS or an SSS or another type of synchronization signal (e.g., such that the lean SSB may include, for example, 12 resource blocks compared to the 20 resource blocks associated with an SSB). As such, a lean SSB may be transmitted within a configured narrow bandwidth part (NBWP) and may support reduced capability devices (e.g., bandwidth reduced user equipment (UEs)) while maintaining compatibility with other devices (e.g., traditional or full capability devices). The techniques described herein may further provide for lean SSB repetition, beam management (e.g., narrower beams) enabled via lean SSBs, etc.

For example, a base station and UE may establish a connection during an initial connection procedure using the SSB from the base station, e.g., the full SSB, which may include at least a first synchronization signal. However, the configuration for a transmission pattern for the first synchronization signal (e.g., the lean synchronization signal, which may also be called the lean SSB) may be identified by the base station and UE, e.g., the configuration may be adopted in standards and therefore known by the base station and UE, using a configuration signal from the base station, and/or implicitly indicated to the UE. Accordingly the base station may transmit the first synchronization signal according to the transmission pattern (e.g., the base station may transmit the lean SSB according to the transmission pattern identified in the configuration). The UE may receive one or more instances of the first synchronization signal and modify its established connection with the base station using the received instances of the first synchronization signal. For example, the UE may utilize one or more instances of the received first synchronization signal for beam management as well as time, phase, and/or frequency tracking purposes.

A method of wireless communication at a UE is described. The method may include establishing a connection with a base station based on a SSB from the base station, the SSB includes at least a first synchronization signal, identifying a configuration for a transmission pattern for the first synchronization signal to be transmitted by the base station, receiving one or more instances of the first synchronization signal according to the transmission pattern for the first synchronization signal, and modifying the established connection with the base station based on the received one or more instances of the first synchronization signal.

An apparatus for wireless communication at a UE is described. The apparatus may include a processor, memory coupled with the processor, and instructions stored in the memory. The instructions may be executable by the processor to cause the apparatus to establish a connection with a base station based on a SSB from the base station, the SSB includes at least a first synchronization signal, identify a configuration for a transmission pattern for the first synchronization signal to be transmitted by the base station, receive one or more instances of the first synchronization signal according to the transmission pattern for the first synchronization signal, and modify the established connection with the base station based on the received one or more instances of the first synchronization signal.

Another apparatus for wireless communication at a UE is described. The apparatus may include means for establishing a connection with a base station based on a SSB from the base station, the SSB includes at least a first synchronization signal, identifying a configuration for a transmission pattern for the first synchronization signal to be transmitted by the base station, receiving one or more instances of the first synchronization signal according to the transmission pattern for the first synchronization signal, and modifying the established connection with the base station based on the received one or more instances of the first synchronization signal.

A non-transitory computer-readable medium storing code for wireless communication at a UE is described. The code may include instructions executable by a processor to establish a connection with a base station based on a SSB from the base station, the SSB includes at least a first synchronization signal, identify a configuration for a transmission pattern for the first synchronization signal to be transmitted by the base station, receive one or more instances of the first synchronization signal according to the transmission pattern for the first synchronization signal, and modify the established connection with the base station based on the received one or more instances of the first synchronization signal.

Some examples of the method, apparatuses, and non-transitory computer-readable medium described herein may further include operations, features, means, or instructions for identifying, based on the configuration for the transmission pattern, one or more parameters for the one or more instances of the first synchronization signal, and receiving the one or more instances of the first synchronization signal according to the one or more parameters.

In some examples of the method, apparatuses, and non-transitory computer-readable medium described herein, the one or more parameters include at least one of a slot periodicity within a transmission window for the first synchronization signal, a slot offset for a first slot including the first synchronization signal transmission within the transmission window, a symbol offset for the first synchronization signal transmission within a slot occurring within the transmission window, a symbol periodicity within a slot occurring within the transmission window, or a combination thereof.

Some examples of the method, apparatuses, and non-transitory computer-readable medium described herein may further include operations, features, means, or instructions for receiving, based on the transmission pattern, a first one or more instances of the first synchronization signal associated with a first beam, and receiving, based on the transmission pattern, a second one or more instances of the first synchronization signal associated with a second beam that may be different than the first beam.

In some examples of the method, apparatuses, and non-transitory computer-readable medium described herein, the first beam and the second beam may be associated with a same set of the one or more instances of the first synchronization signal.

In some examples of the method, apparatuses, and non-transitory computer-readable medium described herein, the first beam and the second beam may be associated with different sets of the one or more instances of the first synchronization signal.

In some examples of the method, apparatuses, and non-transitory computer-readable medium described herein, the first beam and the second beam include transmit beams of the base station transmitting the first synchronization signal.

Some examples of the method, apparatuses, and non-transitory computer-readable medium described herein may further include operations, features, means, or instructions for determining, based on the configuration, that a beam repetition pattern may be enabled for synchronization signal transmissions, identifying, based on beam repetition being enabled, a beam repetition pattern for receiving the one or more instances of the first synchronization signal, and receiving the one or more instances of the first synchronization signal according to the beam repetition pattern.

In some examples of the method, apparatuses, and non-transitory computer-readable medium described herein, identifying the configuration may include operations, features, means, or instructions for identifying the configuration via at least one of a configuration adopted by the wireless communication system, or a configuration signal received from the base station, or an implicit indication associated with a different signal configured for the UE.

Some examples of the method, apparatuses, and non-transitory computer-readable medium described herein may further include operations, features, means, or instructions for identifying, based on the configuration, a first bandwidth part for the first synchronization signal, where the first bandwidth part may be different from a second bandwidth part for the SSB used to establish the connection.

Some examples of the method, apparatuses, and non-transitory computer-readable medium described herein may further include operations, features, means, or instructions for determining, based on the configuration, that the transmission pattern for the first synchronization signal may be UE-specific or cell-specific.

Some examples of the method, apparatuses, and non-transitory computer-readable medium described herein may further include operations, features, means, or instructions for receiving a signal activating or deactivating the one or more instances of the first synchronization signal according to the transmission pattern.

In some examples of the method, apparatuses, and non-transitory computer-readable medium described herein, the signal includes at least one of a radio resource control (RRC) signal, or a medium access control (MAC) control element (CE), or a combination thereof.

In some examples of the method, apparatuses, and non-transitory computer-readable medium described herein, the signal activates or deactivates the one or more instances of the first synchronization signal for at least one of the UE, or a group of UEs that include the UE, or for a bandwidth part, or for the base station, or a combination thereof.

Some examples of the method, apparatuses, and non-transitory computer-readable medium described herein may further include operations, features, means, or instructions for transmitting a signal requesting activation or deactivation of the one or more instances of the first synchronization signal according to the transmission pattern.

In some examples of the method, apparatuses, and non-transitory computer-readable medium described herein, the signal indicates one or more requested parameters for the one or more instances of the first synchronization signal.

In some examples of the method, apparatuses, and non-transitory computer-readable medium described herein, the synchronization signal block includes a primary synchronization signal, a secondary synchronization signal, and a physical broadcast channel, and the first synchronization signal is the primary synchronization signal or the secondary synchronization signal.

A method of wireless communication at a base station is described. The method may include establishing a connection with a UE based on a SSB from the base station, the SSB includes at least a first synchronization signal, identifying a configuration for a transmission pattern for the first synchronization signal to be transmitted by the base station, and transmitting one or more instances of the first synchronization signal according to the transmission pattern for the first synchronization signal.

An apparatus for wireless communication at a base station is described. The apparatus may include a processor, memory coupled with the processor, and instructions stored in the memory. The instructions may be executable by the processor to cause the apparatus to establish a connection with a UE based on a SSB from the base station, the SSB includes at least a first synchronization signal, identify a configuration for a transmission pattern for the first synchronization signal to be transmitted by the base station, and transmit one or more instances of the first synchronization signal according to the transmission pattern for the first synchronization signal.

Another apparatus for wireless communication at a base station is described. The apparatus may include means for establishing a connection with a UE based on a SSB from the base station, the SSB includes at least a first synchronization signal, identifying a configuration for a transmission pattern for the first synchronization signal to be transmitted by the base station, and transmitting one or more instances of the first synchronization signal according to the transmission pattern for the first synchronization signal.

A non-transitory computer-readable medium storing code for wireless communication at a base station is described. The code may include instructions executable by a processor to establish a connection with a UE based on a SSB from the base station, the SSB includes at least a first synchronization signal, identify a configuration for a transmission pattern for the first synchronization signal to be transmitted by the base station, and transmit one or more instances of the first synchronization signal according to the transmission pattern for the first synchronization signal.

Some examples of the method, apparatuses, and non-transitory computer-readable medium described herein may further include operations, features, means, or instructions for identifying, based on the configuration for the transmission pattern, one or more parameters for the one or more instances of the first synchronization signal, and transmitting the one or more instances of the first synchronization signal according to the one or more parameters.

In some examples of the method, apparatuses, and non-transitory computer-readable medium described herein, the one or more parameters include at least one of a slot periodicity within a transmission window for the first synchronization signal, a slot offset for a first slot including the first synchronization signal transmission within the transmission window, a symbol offset for the first synchronization signal transmission within a slot occurring within the transmission window, a symbol periodicity within a slot occurring within the transmission window, or a combination thereof.

Some examples of the method, apparatuses, and non-transitory computer-readable medium described herein may further include operations, features, means, or instructions for transmitting, based on the transmission pattern, a first one or more instances of the first synchronization signal associated with a first beam, and transmitting, based on the transmission pattern, a second one or more instances of the first synchronization signal associated with a second beam that may be different than the first beam.

In some examples of the method, apparatuses, and non-transitory computer-readable medium described herein, the first beam and the second beam may be associated with a same set of the one or more instances of the first synchronization signal.

In some examples of the method, apparatuses, and non-transitory computer-readable medium described herein, the first beam and the second beam may be associated with different sets of the one or more instances of the first synchronization signal.

In some examples of the method, apparatuses, and non-transitory computer-readable medium described herein, the first beam and the second beam include transmit beams of the base station transmitting the first synchronization signal.

Some examples of the method, apparatuses, and non-transitory computer-readable medium described herein may further include operations, features, means, or instructions for determining, based on the configuration, that a beam repetition pattern may be enabled for the first synchronization signal transmissions, identifying, based on beam repetition being enabled, a beam repetition pattern for transmitting the one or more instances of the first synchronization signal, and transmitting the one or more instances of the first synchronization signal according to the beam repetition pattern.

In some examples of the method, apparatuses, and non-transitory computer-readable medium described herein, identifying the configuration may include operations, features, means, or instructions for identifying the configuration via at least one of a configuration adopted by the wireless communication system, or a configuration signal transmitted from the base station, or an implicit indication associated with a different signal configured for the UE.

Some examples of the method, apparatuses, and non-transitory computer-readable medium described herein may further include operations, features, means, or instructions for identifying, based on the configuration, a first bandwidth part for the first synchronization signal, where the first bandwidth part may be different from a second bandwidth part for the SSB used to establish the connection.

Some examples of the method, apparatuses, and non-transitory computer-readable medium described herein may further include operations, features, means, or instructions for determining, based on the configuration, that the transmission pattern for the first synchronization signal may be UE-specific or cell-specific.

Some examples of the method, apparatuses, and non-transitory computer-readable medium described herein may further include operations, features, means, or instructions for transmitting a signal activating or deactivating the one or more instances of the first synchronization signal according to the transmission pattern.

In some examples of the method, apparatuses, and non-transitory computer-readable medium described herein, the signal includes at least one of an RRC signal, or a MAC CE, or a combination thereof.

In some examples of the method, apparatuses, and non-transitory computer-readable medium described herein, the signal activates or deactivates the one or more instances of the first synchronization signal for at least one of the UE, or a group of UEs that include the UE, or for a bandwidth part, or for the base station, or a combination thereof.

Some examples of the method, apparatuses, and non-transitory computer-readable medium described herein may further include operations, features, means, or instructions for receiving a signal requesting activation or deactivation of the one or more instances of the first synchronization signal according to the transmission pattern.

In some examples of the method, apparatuses, and non-transitory computer-readable medium described herein, the signal indicates one or more requested parameters for the one or more instances of the first synchronization signal.

DETAILED DESCRIPTION

Figure 1:
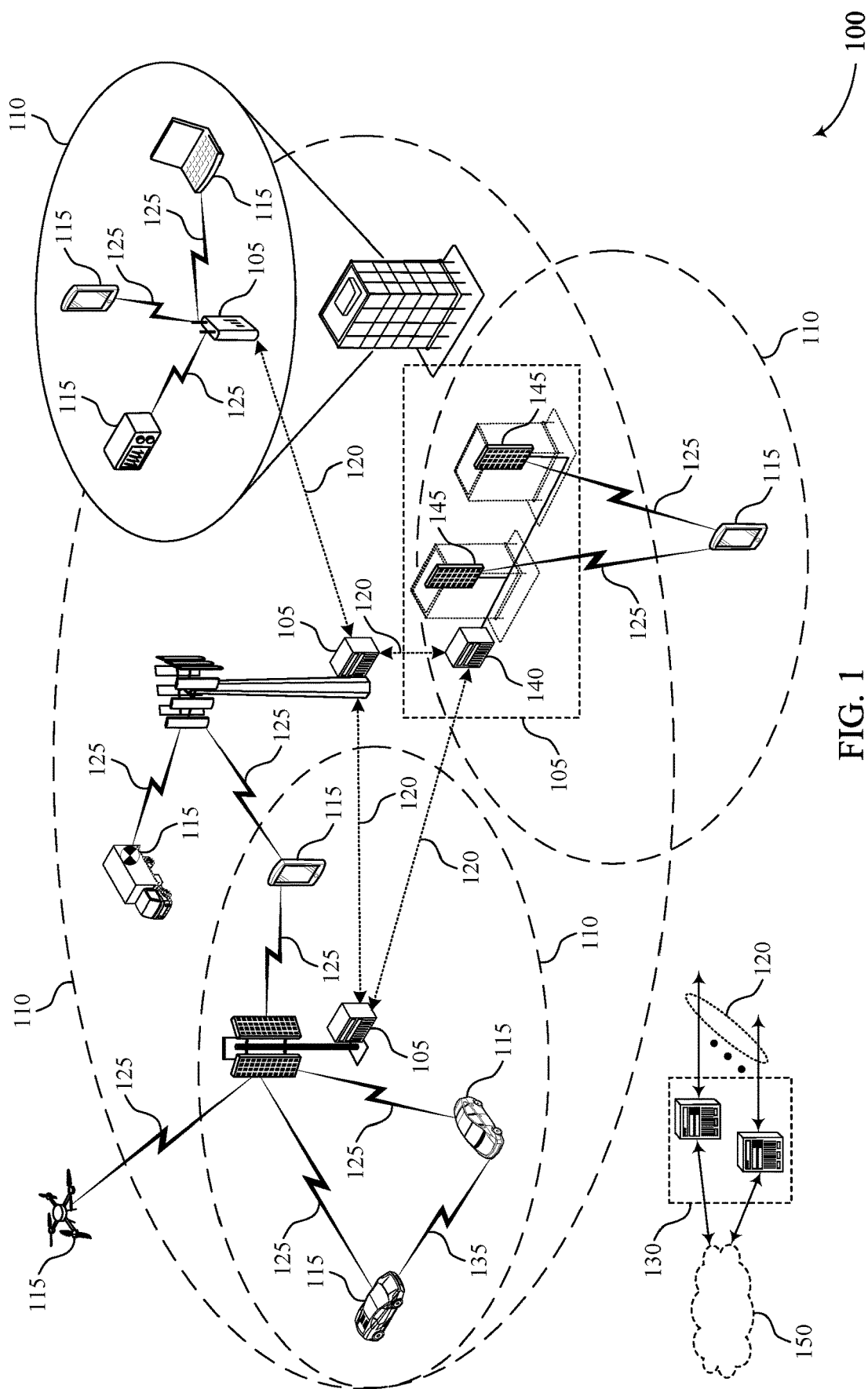
FIG. 1 illustrates an example of a system for wireless communications that supports periodic lean synchronization signal design in accordance with aspects of the present disclosure.

A base station may transmit one or more synchronization signal blocks (SSBs) to a user equipment (UE), and the UE may process (e.g., decode) the SSBs in order to obtain system information and begin communications with the base station, e.g., the base station and UE may establish an initial connection based on the SSB. An SSB (e.g., a synchronization block) may include synchronization signals such as a primary synchronization signal (PSS), a physical broadcast channel (PBCH), and a secondary synchronization signal (SSS), which may be referred to as acquisition signals and may be transmitted from the base station to the UE. The PSS, PBCH, and SSS may each occupy different sets of symbols (e.g., orthogonal frequency division multiplexing (OFDM) symbols) and subcarriers of the SSB. A UE may utilize SSBs to acquire downlink synchronization information and system information (e.g., to establish a communication channel or connection with the base station). In some cases, some wireless communication systems may further utilize SSBs with beam sweeping for beam management purposes.

A reduced capability UE (e.g., a low tier UE, a New Radio (NR)-light UE, etc.) may operate with one or more of a reduced transmit power, a reduced number of transmit and/or receive antennas, a reduced transmit/receive bandwidth, or reduced computational complexity. For example, a reduced capability UE may be a smart wearable device, an industrial sensor, a video surveillance device, etc. The techniques described herein may provide for a lean SSB design to reduce SSB bandwidth and support beam management and/or time-frequency tracking functionality for reduced capability UEs. According to the described techniques, reduced capability UEs may thus reduce power consumption and conserve computational resources by reducing its operating bandwidth (e.g., compared to operating bandwidth associated with monitoring of traditional SSBs).

The described lean SSB designs may support narrow bandwidth part (NBWP) configuration for reduced capability UEs. For example, a lean SSB (which may also be referred to as one or more of a synchronization signal, first synchronization signal, or lean synchronization signal) may include the PSS or the SSS (e.g., such that the lean SSB may include, for example, 12 resource blocks compared to the 20 resource blocks associated with SSB used to establish the initial connection). As such, a base station may beam sweep lean SSBs in a NBWP, and reduced capability UEs may use lean SSBs for beam management purposes. The techniques described herein may further provide for lean SSB repetition, beam management (e.g., narrower beams) enabled via lean SSBs, data inclusion in remaining symbols of lean SSBs, etc.

Moreover, the techniques described herein may reduce SSB bandwidth (e.g., via the lean SSB design using one or more instances of the first synchronization signal) for NBWP configuration (e.g., a lean SSB may reduce SSB bandwidth from 20 resource blocks to 12 resource blocks via exclusion of PBCH). Further, in some cases, a lean SSB may include a first synchronization signal (e.g., a PSS or SSS) spanning a single symbol. As such, lean SSBs may make available more symbols in the time domain to provide for synchronization signal repetition (e.g., in case of coverage recovery), more beams for finer beam sweeping granularity (e.g., as lean SSBs may allow for narrower beams, better coverage, etc.), more symbols for other channels (e.g., such as for physical downlink shared channel (PDSCH) data), etc. Further, the described lean SSB design and configuration may maintain compatibility with other devices (e.g., with traditional or full capability devices) and may minimize any physical layer (e.g., L1) disruptions or changes in existing wireless communication systems.

Aspects of the disclosure are initially described in the context of wireless communication systems. For example, a base station and UE may establish a connection during an initial connection procedure using the SSB from the base station, e.g., the full SSB, where the SSB includes at least a first synchronization signal. However, the configuration for a transmission pattern for the first synchronization signal (e.g., the lean synchronization signal, which may also be called the lean SSB) may be identified by the base station and UE, e.g., the configuration may be adopted in standards and therefore known by the base station and UE, using a configuration signal from the base station, and/or implicitly indicated to the UE. Accordingly the base station may transmit the first synchronization signal according to the transmission pattern (e.g., the base station may transmit the lean SSB according to the transmission pattern identified in the configuration). The UE may receive one or more instances of the first synchronization signal and modify its established connection with the base station using the received instances of the first synchronization signal. For example, the UE may utilize one or more instances of the received first synchronization signal for beam management as well as time and/or frequency tracking purposes.

Aspects of the disclosure are further illustrated by and described with reference to apparatus diagrams, system diagrams, and flowcharts that relate to periodic lean synchronization signal design.

FIG. 1 illustrates an example of a wireless communication system 100 that supports periodic lean synchronization signal design in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communication system 100 may support reduced capability UEs 115, which may also be referred to as low tier UEs 115, NR-Light UEs 115, etc. A reduced capability UE may operate with one or more of a reduced transmit power, a reduced number of transmit and/or receive antennas, a reduced transmit/receive bandwidth, or reduced computational complexity. For example, a reduced capability UE may be a smart wearable device, an industrial sensor, a video surveillance device, etc. In some cases, reduced capability UEs 115 may be associated with a reduced number of UE receive/transmit antennas, UE bandwidth reduction, half-duplex-FDD, relaxed UE processing time, relaxed UE processing capability, etc. As such, wireless communication system 100 may support UE power saving and battery lifetime enhancement for reduce capability UEs 115 in applicable use cases (e.g., in delay tolerant use cases). For example, wireless communication system 100 may support techniques such as reduced PDCCH monitoring by smaller numbers of blink decodes and control channel element (CCE) limits, extended discontinuous reception (DRX) for radio resource control (RRC) Inactive and/or Idle, radio resource management (RRM) relaxation for stationary devices, etc.

As described herein, wireless communication system 100 may support reduced capability UEs 115 via a leaner SSB design, NBWP configuration, etc. For example, wireless communication system 100 may utilize SSBs with beam sweeping for beam management purposes. The described lean SSBs may be utilized to maintain such functionality for reduced capability UEs 115. For example, an SSB (e.g., a generic SSB or an SSB transmitted within a BWP for traditional or full capability UEs 115) may include a PSS, a SSS, and a PBCH. According to the techniques described herein, a lean SSB may include one of either the PSS or the SSS (e.g., such that the lean SSB may include, for example, 12 resource blocks compared to the 20 resource blocks associated with an SSB). As such, a lean SSB may be transmitted (e.g., base stations 105 may beam sweep lean SSBs) within a configured NBWP to support reduced capability devices (e.g., bandwidth reduced UEs 115) while maintaining compatibility with other devices (e.g., with other traditional or full capability UEs 115). Wireless communication system 100 may further support lean SSB repetition, beam management (e.g., narrower beams) enabled via lean SSBs, data inclusion in remaining symbols of lean SSBs, etc., as described herein.

A UE 115 may establish a connection with a base station 105 based at least in part on a SSB from the base station 105, the SSB including at least a first synchronization signal. The UE 115 may identify a configuration for a transmission pattern for the first synchronization signal to be transmitted by the base station 105. The UE 115 may receive one or more instances of the first synchronization signal according to the transmission pattern for the first synchronization signal. The UE 115 may modify the established connection with the base station 105 based at least in part on the received one or more instances of the first synchronization signal.

A base station 105 may establish a connection with a UE 115 based at least in part on a SSB from the base station 105, the SSB including at least a first synchronization signal. The base station 105 may identify a configuration for a transmission pattern for the first synchronization signal to be transmitted by the base station 105. The base station 105 may transmit one or more instances of the first synchronization signal according to the transmission pattern for the first synchronization signal.

Figure 2:
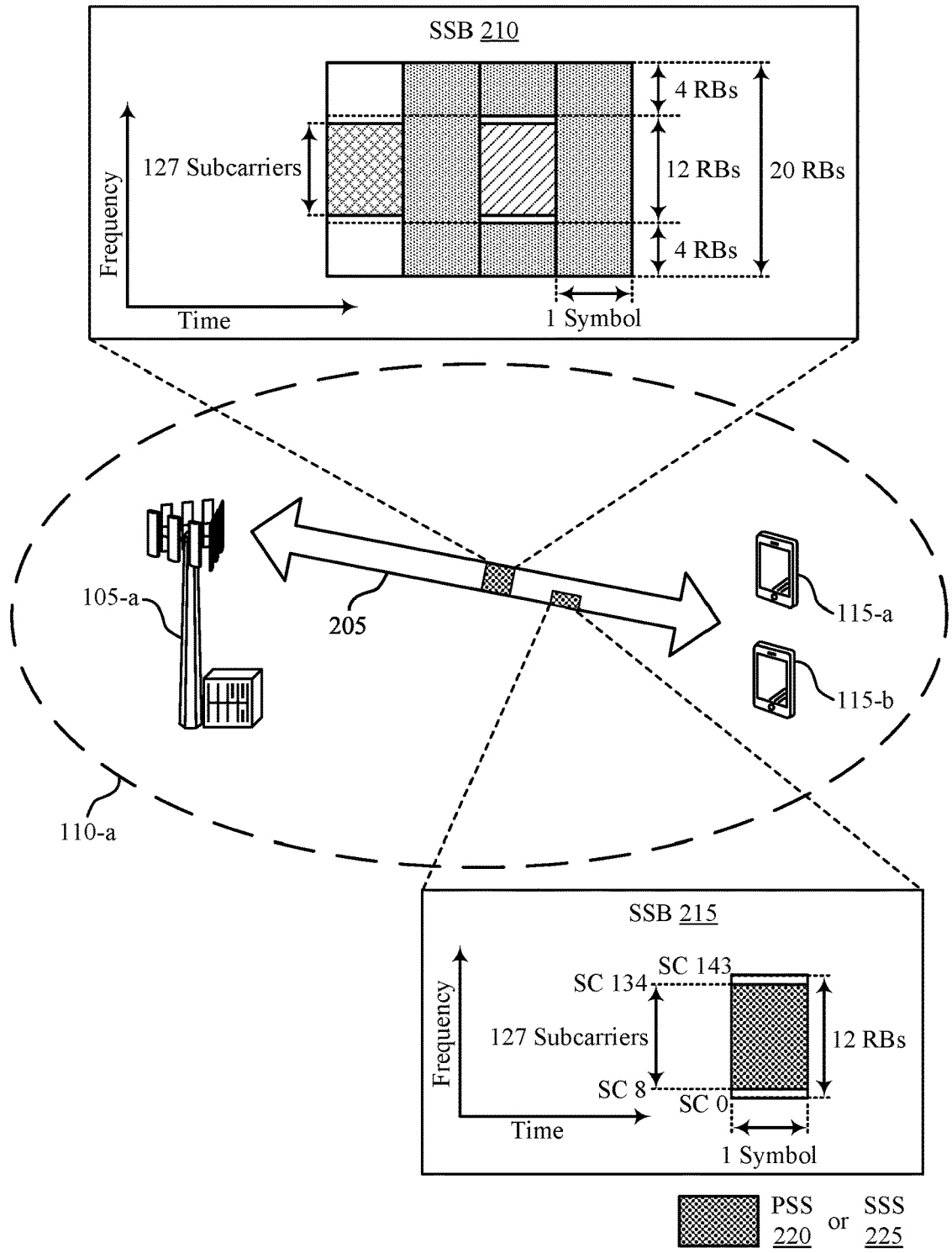
FIG. 2 illustrates an example of a wireless communication system that supports periodic lean synchronization signal design in accordance with aspects of the present disclosure.

FIG. 2 illustrates an example of a wireless communication system 200 that supports periodic lean synchronization signal design in accordance with aspects of the present disclosure. In some examples, wireless communication system 200 may implement aspects of wireless communication system 100. Wireless communication system 200 may include base station 105-*a*, UE 115-*a*, and UE 115-*b*, which may be examples of a base station 105 and UEs 115, respectively, as described herein. Base station 105-*a*, UE 115-*a*, and UE 115-*b* may be configured to use lean SSBs 215 in accordance with the techniques described herein.

In some examples, base station 105-*a* may be an NR base station communicating via link 205 with UEs 115-*a* and 115-*b* within coverage area 110-*a*. In some cases, base station 105-*a* may transmit an SSB 210 (e.g., a generic SSB 210 via a BWP). SSB 210 may be used by a UE 115 to synchronize with a cell (e.g., base station 105-*a*). The y axis of SSB 210 may show frequency while the x axis shows time. The SSB 210 may include four OFDM symbols (symbol periods). The first symbol may include a PSS 220. In some examples, the PSS 220 may occupy 127 subcarriers. The second and fourth symbols may include PBCH 230, which may each span the 20 RBs. The third symbol may include SSS 225, which may occupy 127 subcarriers, in between two portions of PBCH 230, each portion spanning 4 RBs. For example a UE 115 may receive a PSS 220 in a first symbol period of SSB 210 and may identify the SSB 210 based on detection (e.g., peak correlation) of the PSS 220. Accordingly, the UE 115 may proceed to decode the PBCH 230 and SSS 225 of the SSB 210.

In some cases, SSB 210 may be a cell defining SSB. For example, within the frequency span of a carrier, multiple SSBs 210 may be transmitted by the base station 105-*a* to UEs 115. The Physical Cell Identifiers (PCIs) of SSBs 210 transmitted in different frequency locations may not necessarily be unique to the cell. Thus, the PCIs may not be the same, and different SSBs in the frequency domain may have different PCIs. When an SSB 210 is associated with remaining minimum system information (RMSI), the SSB may correspond to an individual cell, which may have a unique NR Cell Global Identifier (NCGI). Such an SSB 210 with the unique NCGI may be referred to as a cell defining SSB. In some cases, cell selection and/or reselection, by a UE 115, may be based on one or more reference signal receive power (RSRP) or reference signal receive quality (RSRQ) measurements of the cell defining SSB. In some examples, after a UE 115 receives the SSB 210, the UE 115 may decode the SSB 210 to identify the MIB. The MIB may indicate the CORESET and synchronization signal configuration, which may allow the UE 115 to receive and decode the PDCCH. The PDCCH may indicate the PDSCH to the UE 115, which may include the SIB that includes the RMSI.

Further, in some cases, wireless communication system 200 may utilize SSBs 210 to establish and/or maintain synchronization and beam management between base station 105-*a* and UEs 115. For example, SSBs 210 may be used for time/frequency tracking at a UE 115 to allow for time tracking loops and/or frequency tracking loops to be maintained by the UE 115. In other words, a UE 115 may utilizes SSBs 210 for beam management procedures, which may include, for example, the UE 115 updating a beam configuration for any downlink resources (e.g., such as one or more updates to time tracking parameters in a time tracking loop, one or more updates to frequency tracking parameters in a frequency tracking loop, etc.). In some cases, updating a beam configuration may include updating from a first set of beams for transmission and reception to a second set of beams for improved transmission and reception. SSBs 210 may be used, in some cases, for time/frequency tracking for a particular bandwidth (or BWP), to measure a delay spread, a delay offset, a power delay profile, a Doppler spread, a Doppler offset, timing information, frequency offset information, receive spatial filtering, etc.

In some cases, a first type of UE, such as a reduced capability UE 115-*b* (e.g., a low tier UE 115-*b*, an NR-Light UE 115-*b*, etc.) may include lower UE capabilities compared to a second type of UE, such as a generic UE 115-*a* (e.g., a full capability UE 115-*a*, a premium UE 115-*a*, etc.). As discussed herein, lean SSBs 215 may reduce SSB bandwidth (e.g., compared to SSBs 210) and support beam management functionality for reduced capability UEs (e.g., such as for reduced capability UE 115-*b*). Lean SSBs 215 may provide for reduced bandwidth and lower computational complexity (e.g., and thus reduced power consumption) for a reduced capability UE 115-*b*, as reduced capability UE 115-*b* may be configured with a NBWP and may not be configured to decode the larger spanning bandwidth (e.g., 20 resource blocks) associated with SSBs 210.

Lean SSBs 215 may be an example of one or more instances of a synchronization signal (e.g., a first synchronization signal) received by the UE 115. For example, lean SSBs 215 may include a first synchronization signal over a reduced bandwidth (e.g., compared to SSBs 210). For example, leans SSBs may include a synchronization signal spanning 127 subcarriers in frequency and a single symbol in time (e.g., the y axis of SSB 215 may show frequency while the x axis shows time). The synchronization signal may include a PSS 220 or SSS 225 such that lean SSBs 215 may be used for beam management and/or time-frequency tracking purposes by reduced capability UEs (e.g., UE 115-b) as described herein. For example, during beam adjustments or beam maintenance (e.g., beam management procedures), the PBCH may be unnecessary, and since a UE 115 may already know the PCI and may already be time aligned with the network, both PSS 220 and SSS 225 may also not be necessary. As such, lean SSBs 215 may be reduced to one of PSS 220 or SSS 225 (e.g., the first synchronization signal). In other words, lean SSBs 215 may exclude PBCH 230 typically included in SSBs 210 (e.g., which may reduce the bandwidth of lean SSBs 215 from 20 resource blocks (RBs) associated with SSBs 210 down to 12 RBs). For instance, excluding the PBCH 230 from a lean SSB 215 may leave 12 RBs which may be the same as PSS 220 or SSS 225. As such, lean SSBs 215 may include one of either PSS 220 or SSS 225, as PSS 220 and SSS 225 have similar design (e.g., length-127 M-sequence) and either can be used for the purpose of beam management.

Further, as lean SSBs 215 may include PSS 220 or SSS 225 (e.g., with the other of the PSS 220 or SSS 225 and the PBCH excluded), lean SSBs 215 may span one symbol in the time domain. In some cases, wireless communication system 200 may maintain time continuity between SSBs 210 and lean SSBs 215. As such, more symbols in time may be available when utilizing lean SSBs 215 (e.g., as there may be three remaining symbols, in addition to the single symbol of the lean SSB 215, for time continuity with the four symbols of SSB 210). The additional available symbols in time (e.g., the three additional symbols) may be utilized for synchronization signal repetition (e.g., in case of coverage recovery). Additionally or alternatively, the additional available symbols in time may be utilized for more beams to sweep (e.g., may allow for narrower beams and possibly improved coverage). Additionally or alternatively, the additional available symbols in time may be utilized for more symbols for other channels (e.g., the additional symbols may include PDSCH).

The techniques described herein may avoid ambiguity between SSBs 210 and lean SSBs 215. For example, generic UEs (e.g., legacy UEs, such as UE 115-a) may not detect lean SSBs 215 (e.g., generic UEs 115 may not detect peak correlations due to lean SSBs 215, which may otherwise result in generic UE 115 detection of the lean SSB 215). For instance, center frequencies for lean SSBs 215 may not coincide with SSB 210 synchronization raster, PSS 220 associated with lean SSBs 215 may use different M-sequence parameters to generate the PSS 220 of a lean SSB 215, etc.

As discussed, in some examples, center frequencies for lean SSBs 215 may not coincide with SSB 210 synchronization raster. In some cases, lean SSBs 215 may use different M-sequence parameters to generate the lean SSB 215 in a NBWP with some mapping to the original SSB 210. For example, in some cases, lean SSBs 215 may use different M-sequence parameters to generate a PSS 220 (e.g., of a lean SSB 215, which may also be referred to as a first synchronization signal in some examples) in a NBWP with some mapping to the original PSS 220 (e.g., of a SSB 210). For example, $N_{ID_{NB\text{-}BWP}}^{(2)} = N_{ID}^{(2)} + \delta$ (e.g., where $\delta \geq 3$ may be preconfigured by the wireless communication system or may be signaled from base station 105-a to UEs 115). For example, the M-sequence parameters to generate a PSS 220 (e.g., for SSBs 210) may include a cell identity within the group ($N_{ID}^{(2)}$), and the M-sequence parameter to generate the PSS 220 for a lean SSB 215 may include a cell identity within the group for the NBWP ($N_{ID_{NB\text{-}BWP}}^{(2)}$) which may be some offset $\delta$ from $N_{ID}^{(2)}$.

In some cases, lean SSBs 215 may include only SSS 225 (e.g., such that generic UEs 115 may not detect a PSS 220 and thus may not detect lean SSBs 215, however reduced capability UE 115-b may be configured to detect the SSS 225 of lean SSBs 215). For instance, in examples where lean SSBs 215 include only SSS 225 (e.g., the first synchronization signal in this example), confusion for UEs 115 performing initial access procedures and generic UEs 115 may be avoided (e.g., as UEs 115 may not be aware that a SSS 225 may not have an associated PSS 220 and PBCH 230 with it). Additionally or alternatively, center frequency offset techniques, M-sequence parameter offset techniques, etc. may be implemented to mitigate undesired detection (e.g., peak correlation detections) of lean SSBs 215 in scenarios where such detection may degrade system performance.

For example, during initial acquisition, UEs 115 may search for PSS sequences (e.g., PSS 220) first and then SSS 225. According to the techniques described herein, UEs 115 doing initial access (e.g., reduced capability UEs 115 doing initial access), and generic UEs 115 in general, may not increase their probability of finding peak correlations within NBWP regions. In some cases, NBWP center frequency adjustments/restrictions, synchronization signal sequence changes (e.g., lean SSB M-sequence changes), etc. may be used for lean SSB 215 designs including PSS 220 and for lean SSB 215 designs including SSS 225. In some cases, lean SSB 215 designs including SSS 225 may not necessarily use NBWP center frequency adjustments/restrictions, synchronization signal sequence changes (e.g., lean SSB M-sequence changes), etc., as lean SSBs 215 including SSS 225 may not result in ambiguity potentially arising from detection of PSS 220 within a NBWP.

If UE 115-a is a generic or regular capability UE 115 and a lean SSB 215 is associated with reduced capability UEs 115, then UE 115-a may not monitor for (e.g., may not detect peak PSS correlation for) the lean SSB 215 (e.g., such that lean SSBs 215 may be compatible with other UEs 115 such as UE 115-a). If UE 115-b is a reduced capability or low tier UE 115, the UE 115-b may proceed with the synchronization and decoding of the lean SSB 215 based on the configuration of the lean SSB (e.g., and the NBWP).

For example, for some wireless communication systems (e.g., frequency range 2 (FR2) systems), start symbols for SSBs 210 may be configured such that SSBs 210 may be repeated (e.g., 64 times) where, in some cases, different beams may be used by base station 105-a to beam sweep the SSBs 210. For instance for a 120 kHz SCS in a FR2 system, the SSB symbol start may be configured as:
{4, 8, 16, 20}+28*n, where n=0, 1, 2, 3, 5, 6, 7, 8, 10, 11, 12, 13, 15, 16, 17, 18. Such may result in SSB 210 being repeated 64 times where each SSB 210 may be associated with a different beam.

As discussed herein, lean SSBs 215 may maintain the 12 RB structure (e.g., in the frequency domain) with gaps on either side of the first synchronization signal (e.g., on either side of the PSS 220 or SSS 225). That is, lean SSBs 215 may include 12 RBs, where the center 127 subcarriers are used for PSS 220 or SSS 225 and the gaps on either side (e.g., subcarrier (SC) 0 though SC7 and SC135 through SC143) may be set to zero (0). In the time domain (e.g., to reduce or minimize impact on other non-SSB channels), the symbol start times and symbols reserve/gaps may be maintained across SSBs 210 and lean SSBs 215.

As lean SSBs 215 may include a single symbol for the first synchronization signal, the remaining three symbols (e.g., in total corresponding in time with four symbols of SSBs 210) may be used advantageously by the wireless communication system 200. For example, wireless communication system 200 may configure synchronization signal repetitions per beam (e.g., the first synchronization signal may be repeated up to four times across the four symbols, for enhanced coverage of up to, for example, 6 dB improvement). Additionally or alternatively, wireless communication system 200 may configure an increased number of beams, as NBWP may support narrower beams for enhanced coverage (e.g., up to 64×4=256 beams may be supported due to the lean SSB 215 and the four symbol durations). Additionally or alternatively, wireless communication system 200 may configure other data or information that may be communicated in the additional three symbols (e.g., wireless communication system 200 may configure PDSCH transmission in one or more of the additional three symbols).

In some cases, base station 105-a may configure and signal downlink reference signal resources to UEs 115 with transmission configuration indicator (TCI) states. In some examples, TCI states may indicate a quasi-co-location (QCL) relationship for a downlink transmission (e.g., PDCCH and PDSCH communications) with different reference signals. As such, each TCI state may consist of one reference signal set for different QCL types. As such, wireless communication system 200 may configure lean SSBs 215 to be QCL'ed with other reference signals. Also, tracking reference signal (TRS), channel state information reference signal (CSI-RS), and demodulation reference signal (DMRS) (e.g., for PDSCH and PDCCH) may be QCL'ed with lean SSBs 215.

For example, wireless communication system 200 may configure one or more of the following QCL relationships:
SSB 210→Lean SSB 215
Lean SSB 215→TRS
Lean SSB 215→CSI→RS for beamforming
Lean SSB 215→CSI→RS for CSI
Lean SSB 215→DMRS for PDCCH (if no TRS configured)
Lean SSB 215→DMRS for PDSCH (if no TRS configured)

The described techniques may provide for lean SSBs 215 for reduced capability UEs 115 (e.g., for beam management procedures and/or time-frequency tracking purposes performed by reduced capability UE 115-b). Thus, a reduced capability UE 115 may conserve power, reduce bandwidth, etc. by reducing its operating bandwidth otherwise associated with SSBs 210 used for beam management procedures, by avoiding decoding computations associated with PBCH 230, etc. Further, according to techniques described herein, generic or full capability UEs 115 may not detect (e.g., or may ignore) such lean SSBs (e.g., within a configured NBWP) that are associated with reduced capability UEs, and generic or full capability UEs 115 may instead maintain utilization of SSBs 210 without interruption by (e.g., undesired detection of peak correlation of) lean SSBs 215. The example techniques described (e.g., with reference to SSBs 210 and lean SSBs 215) may be applied in other examples (e.g., for other transmissions, such as other control transmissions in addition to SSBs) to support reduce capability UEs 115, NBWP configuration, etc.

Accordingly, aspects of the describe techniques may include base station 105-a and UE 115 establishing a connection during an initial connection procedure using SSB 210 from the base station 105-a, e.g., the full SSB. However, the configuration for a transmission pattern for a first synchronization signal (e.g., the lean synchronization signal, such as lean SSB 215) may be identified by the base station 105-a and UE 115, e.g., the configuration may be adopted in standards and therefore known, using a configuration signal from base station 105-a, and/or implicitly indicated to the UE 115. Accordingly base station 105-a may transmit the first synchronization signal according to the transmission pattern (e.g., the base station 105-a may transmit the lean SSB 215 according to the transmission pattern identified in the configuration). The UE 115 may receive one or more instances of the first synchronization signal and modify its established connection with base station 105-a using the received instances of the first synchronization signal. For example, the UE 115 may utilize one or more instances of the received first synchronization signal for beam management as well as time and/or frequency tracking purposes.

Figure 3:
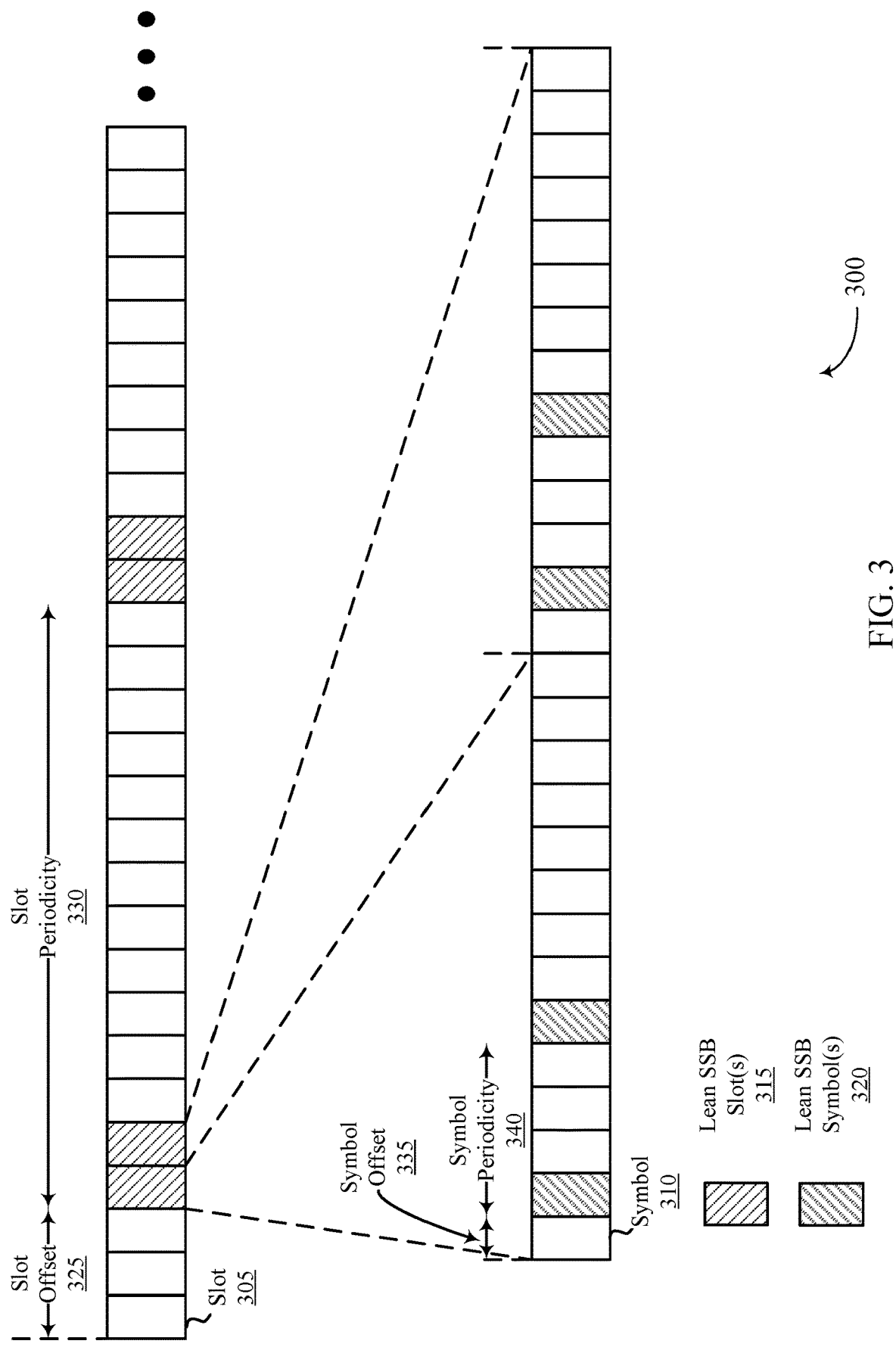
FIG. 3 illustrates an example of a lean synchronization signal block (SSB) configuration that supports periodic lean synchronization signal design in accordance with aspects of the present disclosure.

FIG. 3 illustrates an example of a lean SSB configuration 300 that supports periodic lean synchronization signal design in accordance with aspects of the present disclosure. In some examples, lean SSB configuration 300 may implement aspects of wireless communication systems 100 and/or 200. Aspects of lean SSB configuration 300 may be implemented by a base station and/or UE, which may be examples of the corresponding devices described herein.

As discussed above, the base station and UE may utilize an SSB (e.g., a full SSB, such as SSB 210 of FIG. 2) for downlink beam management. For example, an initial beam establishment procedure may be performed using the full SSB, where the SSB is transmitted on multiple beams in a TDM manner. The UE may measure the beams associated with the SSB and select the best beam as its transmit and/or receive beams. Beam adjustment and recovery procedures may use either the SSB or CSI-RS. For base station transmit beam refinement, the UE measures multiple SSB or CSI-RS instances (with each instance being sent on different beams), and reports back its measurements. The base station uses that report to select the transmit beam. For UE receive beam refinement, the UE may measure multiple repeated CSI-RS instances (sent on the same beam) and select its receive beam accordingly.

In some aspects, the UE may utilize CSI-RS (e.g., tracking reference signal (TRS)) for timing and/or frequency tracking. The TRS may include a resource set consisting of multiple non-zero power CSI-RS (NZP-CSI-RS). This may include two or four one-port density three (e.g., three in every RB) NZP-CSI-RS located in one or two consecutive slots, respectively. There may be a four-symbol time-domain separation between the two CSI-RSs within a slot. The NZP-CSI-RS may have a periodicity of 10, 20, 40, or 80 ms and can use the full BWP bandwidth or a smaller bandwidth.

However, these approaches are inefficient for a variety of reasons. For example, for NBWP operations, the BWP may be narrower than what NR is using currently. For example, if 12 RB use are used for the NBWP, there may be 3*12 (36) tones of CSI-RS (TRS) in the frequency domain. To increase the processing gain for small BWP allocations, this may increase the density of reference signals in the frequency domain. However, the lean SSB as described herein may have the density of 127 tones and a 12 RB BWP, which is approximately four times (~4×) the TRS density. For example, the lean SSB may include one reference signal in the time domain. The minimum period density of SSB may be 5 ms, thus the current SSB design may not work well for frequency tracking for high-speed UEs—since the need for a denser SSB design in the time domain. Since the lean SSB may not be used for initial cell acquisition, it can be configured to adapt to the base station deployment scenario (e.g., a base station serving high-speed UEs vs. normal UEs). Moreover, since the full SSB is already configured, aspects of the described techniques may reuse it with some modified design for time/frequency tracking to reduce their need to configure additional CSI-RS resources. Another option would be to increase the CSI-RS (TRS) density in the frequency domain. However, using the lean SSB design may reduce the need for additional signaling and configuration associated with TRS, reduce UE implementation changes as it already has PSS/SSS processing, and/or the lean SSB design may be used for time and/or frequency tracking as well as beam management.

Accordingly, a base station and UE may establish a connection based at least in part on the SSB of the base station (e.g., the full SSB, such as SSB 210 of FIG. 2). The base station and/or UE may both identify a configuration for a transmission pattern for a first synchronization signal to be transmitted by the base station. In this context, the first synchronization signal may refer to the lean SSB described herein. Broadly, the configuration may be identified using various techniques. For example, the configuration for the transmission pattern of the lean SSB may be known beforehand, e.g., adopted in standards and implemented in the wireless communication system. In another example, the base station may configure the UE with the configuration for the transmission pattern via a configuration signal, such as an RRC configuration signal, MAC control element (CE), downlink control information (DCI), etc. In another example, the configuration for the transmission pattern may be implicitly indicated (e.g., linked to some other reference signal/resource set, such as the normal or full SSB).

In some aspects, the configuration for the transmission pattern of the lean SSB may have various associated properties or parameters. For example, a lean SSB set may include one or more lean SSB symbols in a slot, with the one or more lean SSB symbols in the slot spanning one or more slots. That is, the lean SSB may include a slot offset 325 for a first slot 305 that includes a first synchronization signal transmission within the transmission window. Broadly, the transmission window may refer to a window in which the lean SSB set can be configured, which may refer to a frame, half-frame, sub-frame, etc., boundary. In the example illustrated in FIG. 3, the slot offset 325 for the lean SSB configuration 300 may span three slots 305, by way of example only. The lean SSB set may then span two adjacent lean SSB slots 315 (also by way of example only).

In some aspects, the lean SSB parameter may also include a slot periodicity 330 within the transmission window. Broadly, the slot periodicity 330 refers to the number of times and/or how often the lean SSB slots 315 are repeated within the transmission window (e.g., the distribution of lean SSB slots 315 within the transmission window). In the example illustrated in FIG. 3, the slot periodicity 330 may span 14 slots 305. That is, the transmission window may start with a first slot 305 at the relevant boundary, followed by two lean SSB slots 315. 12 slots 305 later (after the two lean SSB slots 315), the lean SSB set may include another two lean SSB slots 315. This pattern or distribution may be repeated throughout the transmission window with two lean SSB slots 315 occurring every 14 slots 305.

Within a lean SSB slot 315, the parameters for the transmission pattern may also include a symbol offset 335 for the first synchronization signal transmission within a lean SSB slot 315 occurring within the transmission window. That is, each slot 305 may span a number of symbols 310, with 14 symbols 310 being shown by way of example only. The symbol offset 335 may correspond to the number of symbols 310 within a lean SSB slot 315 before the first instance of the lean SSB symbol 320 occurs. In the example illustrated in FIG. 3, the symbol offset 335 spans one symbol 310. Another parameter for the transmission pattern may include the symbol periodicity 340. Broadly, the symbol periodicity 340 identifies the number and/or pattern of lean SSB symbols 320 occurring within the lean SSB slot 315 (e.g., the distribution of lean SSB symbols 320 within the lean SSB slot 315). In the example illustrated in FIG. 3, the symbol periodicity 340 spans four symbols 310. That is, a first instance of a lean SSB symbol 320 may occur in the second symbol 310 of the lean SSB slot 315. The next instance of the lean SSB symbol 320 may occur four symbols 310 later. This pattern or distribution (e.g., the symbol periodicity 340) may be repeated within each lean SSB slot 315.

In some aspects, the lean SSB configuration 300 may be configured (e.g., the configuration for the transmission pattern of the first synchronization signal) for one or more BWPs. That is, the BWP for the first synchronization signal (e.g., the lean SSB configuration 300) may be different than the BWP utilized for the SSB used to establish a connection. In some aspects, the lean SSB configuration 300 may be configured as a UE-specific (e.g., for a particular UE and/or a group of UEs) or cell specific.

In some aspects, the lean SSB configuration 300 may be dynamically (e.g., using MAC CE or DCI) and/or semi-statically (e.g., using RRC signaling) activated/deactivated. For example, the base station may transmit a signal to the UE activating or deactivating the one or more instances of the first synchronization signal according to the transmission pattern. The signal may activate or deactivate the one or more instances of the first synchronization signal for at least one UE, a group of UEs that include the UE, for a particular BWP, and/or for the whole cell (e.g., for the base station). Accordingly, the lean SSB configuration 300 may be turned on/off by the base station via dynamic or semi-static signaling.

Moreover, in some aspects the lean SSB configuration 300 may be activated/deactivated based on a request from the UE. For example, the UE may transmit a signal (e.g., a physical uplink control channel (PUCCH) signal and/or physical uplink shared channel (PUSCH) signal) to the base station requesting activation or deactivation of the one or more instances of the first synchronization signal according to the transmission pattern. The UE may explicitly request activation/deactivation using a bit, field, etc., and/or may implicitly request activation/deactivation (e.g., based on a feedback report, associated with a particular buffer status report (BSR), based on a request for beam management/recovery, etc.). In its request, the UE may request certain configuration parameters for the lean SSB configuration 300, e.g., such as a particular slot offset 325, slot periodicity 330, symbol offset 335, and/or symbol periodicity 340. Other parameters the UE may request may include, not limited to, a particular BWP for the SSB configuration 300.

Accordingly, the UE may receive one or more instances of the first synchronization signal according to the transmission pattern (e.g., may receive one or more instances of a lean SSB symbol 320). The UE may modify the establish a connection with the base station based on the received instances of the first synchronization signal. For example, the UE may perform beam management and/or time/frequency tracking for its established connection with the base station using the lean SSB configuration 300 described herein.

Figure 4:
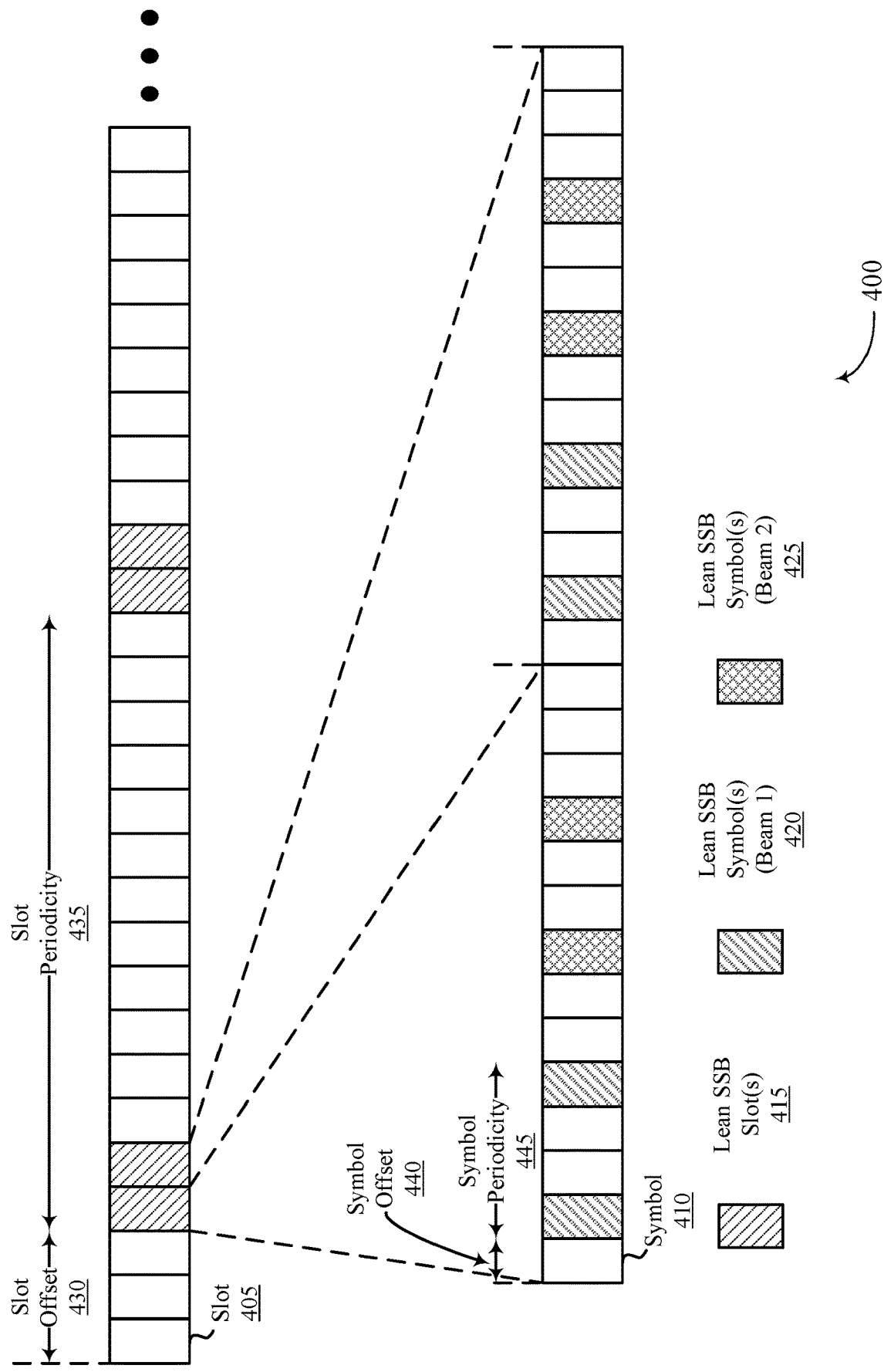
FIG. 4 illustrates an example of a lean SSB configuration that supports periodic lean synchronization signal design in accordance with aspects of the present disclosure.

FIG. 4 illustrates an example of a lean SSB configuration 400 that supports periodic lean synchronization signal design in accordance with aspects of the present disclosure. In some examples, lean SSB configuration 400 may implement aspects of wireless communication systems 100 and/or 200, and/or lean SSB configuration 300. Aspects of lean SSB configuration 400 may be implemented by a base station and/or UE, which may be examples of the corresponding devices described herein.

As discussed above, the base station and UE may establish a connection using an SSB (e.g., a normal or full SSB, such as SSB 210 of FIG. 2) of the base station. The connection may be established as part of an initial connection establishment procedure or cell reselection procedure. The base station and UE may identify a configuration for a transmission pattern for a first synchronization signal (e.g., the lean SSB) to be transmitted by the base station. The configuration for the transmission pattern may include various parameters, such as a slot periodicity 435 within a transmission window, slot offset 430 with respect to the beginning of a transmission window, a symbol offset 440 within a lean SSB slot 415, and/or a symbol periodicity 445 within a lean SSB slot 415, as discussed above. The configuration of the transmission pattern may be dynamically and/or semi-statically activated/deactivated, which may be based on a UE request in some examples. Accordingly, the base station may transmit first synchronization signal(s) according to the transmission pattern. The transmission pattern for the lean SSB (e.g., the first synchronization signal(s)) may include one or more slots 405, with each slot 405 spanning a number of symbols 410 (with 14 symbols 410 per slot 405 shown by way of example only).

In some aspects, the configuration for the transmission pattern may be based on different transmit beams of the base station. That is, the first synchronization signal(s) transmitted by the base station according to the transmission pattern may be transmitted on a single transmit beam of the base station (as shown in lean SSB configuration 300) and/or may be transmitted on multiple transmit beams of the base station (as shown in lean SSB configuration 400). Such beam multiplexing may be implemented according to different options. One option may include one set of lean SSB transmissions per base station transmit beam (e.g., lean SSB symbols for the set belonging to the same transmit beam), with different symbol offsets within a lean SSB slot 415 and slot offset. This option may include a first set of lean SSB transmissions using transmit beam 1 of the base station and a second set of lean SSB transmissions using transmit beam 2 of the base station. Another option may include multiple beams per set of lean SSB transmissions (e.g., lean SSB symbols for the set belonging to different transmit beams of the base station). This option may include the first set of lean SSB transmissions using the first transmit beam and second transmit beam of the base station. Lean SSB configuration 400 illustrates an example where two different transmit beams are used for first synchronization signal transmissions according to the configuration for the transmission pattern.

That is, the first set (and second set, depending on which option is adopted) of lean SSB transmission (e.g., first synchronization signal transmission(s)) may be transmitted in lean SSB symbols 420 of a lean SSB slot 415 using a first transmit beam of the base station while a second set of lean SSB transmissions are transmitted in lean SSB symbols 425 of the lean SSB slot 415 using a second transmit beam of the base station. The configuration for the transmission pattern may indicate which option is selected for the first synchronization signal transmission(s). The UE may receive a first one or more instances of the first synchronization signals (e.g., lean SSB transmissions) associated with a first beam (e.g., transmit beam 1 of the base station) and a second one or more instances of the first synchronization signal associated with a second beam (e.g., transmit beam 2 of the base station) that is different than the first beam. As discussed, the first beam and second beam may be associated with the same set of the one or more instances of the first synchronization signal, or with different sets, depending on the configuration for the transmission pattern.

Accordingly, the UE may receive the first one or more instances of the first synchronization signal associated with the first beam and the second one or more instances of the first synchronization signal associated with the second beam. The UE may update its established connection (e.g., modify various parameters of the established connection) with the base station based on any or all of the received instances of the first synchronization signal transmissions using the first and/or second beams. For example, the UE may perform beam management and/or time/frequency tracking for its established connection with the base station. This may include updating its active transmit/receive beam of the UE, transmitting an updated feedback report to the base station indicating parameters for the first and/or second transmit beams of the base station, updating its timing synchronization with the base station, updating its frequency synchronization with respect to the base station, and the like.

Figure 5:
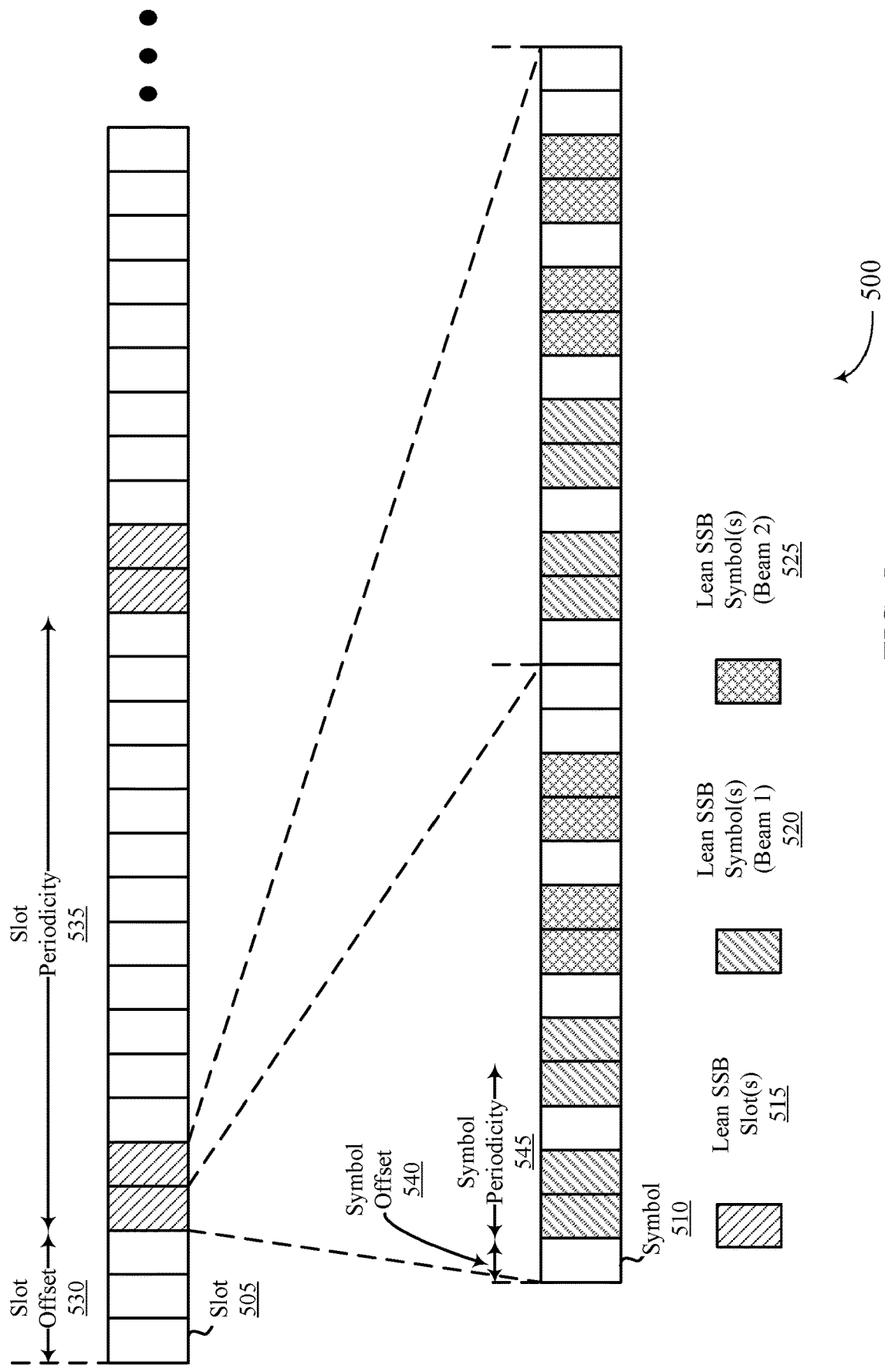
FIG. 5 illustrates an example of a lean SSB configuration that supports periodic lean synchronization signal design in accordance with aspects of the present disclosure.

FIG. 5 illustrates an example of a lean SSB configuration 500 that supports periodic lean synchronization signal design in accordance with aspects of the present disclosure. In some examples, lean SSB configuration 500 may implement aspects of wireless communication systems 100 and/or 200, and/or lean SSB configurations 300 and/or 400. Aspects of lean SSB configuration 500 may be implemented by a base station and/or UE, which may be examples of the corresponding devices described herein.

As discussed above, the base station and UE may establish a connection using an SSB (e.g., a normal or full SSB, such as SSB 210 of FIG. 2) of the base station. The connection may be established as part of an initial connection establishment procedure or cell reselection procedure. The base station and UE may identify a configuration for a transmission pattern for a first synchronization signal (e.g., the lean SSB) to be transmitted by the base station. The configuration for the transmission pattern may include various parameters, such as a slot periodicity 535 within a transmission window, slot offset 530 with respect to the beginning of a transmission window, a symbol offset 540 within a lean SSB slot 515, and/or a symbol periodicity 545 within a lean SSB slot 515, as discussed above. The configuration of the transmission pattern may be dynamically and/or semi-statically activated/deactivated, which may be based on a UE request in some examples. Accordingly, the base station may transmit first synchronization signal(s) according to the transmission pattern. The transmission pattern for the lean SSB (e.g., the first synchronization signal(s)) may include one or more slots 505, with each slot 505 spanning a number of symbols 510 (with 14 symbols 510 per slot 505 shown by way of example only).

In some aspects, the configuration for the transmission pattern may be based on different transmit beams of the base station. Moreover and to support receive beam refinement of the UE, the base station may indicate whether a beam repetition pattern has been enabled for the first synchronization signal transmissions. The base station indicates that beam repetition is enabled, the number of repetitions (N) may be indicated. Accordingly, the lean SSB symbols may be repeated in N consecutive symbols 510 (e.g., transmitted from the same base station transmit beam N times). Lean SSB configuration 500 illustrates an example where Nis equal to two. Accordingly, the UE may determine that beam repetition has been enabled for transmissions of the first synchronization signal, and identify the beam repetition pattern based on beam repetition being enabled. That is, the configuration for the transmission pattern may also indicate whether beam repetition is enabled and, if so, the beam repetition pattern used.

That is, a first set of the lean SSB transmissions (e.g., first synchronization signal transmissions) may be transmitted in two consecutive lean SSB symbols 520 of a lean SSB slot 515 using a first transmit beam of the base station while a second set of lean SSB transmissions are transmitted in two consecutive lean SSB symbols 525 of the lean SSB slot 515 using a second transmit beam of the base station. The configuration for the beam repetition pattern may indicate which option is selected for the first synchronization signal transmissions, e.g., whether each set of lean SSB transmissions are associated with the same beam, or with different beams. The UE may receive a first one or more instances of the first synchronization signals (e.g., lean SSB transmissions) associated with a first beam (e.g., transmit beam 1 of the base station) and a second one or more instances of the first synchronization signal associated with a second beam (e.g., transmit beam 2 of the base station) that is different than the first beam. As discussed, the first beam and second beam may be associated with the same set of the one or more instances of the first synchronization signal, or with different sets, depending on the configuration for the transmission pattern and/or beam repetition pattern.

Accordingly, the UE may receive the first one or more instances of the first synchronization signal associated with the first beam and the second one or more instances of the first synchronization signal associated with the second beam. The UE may update its established connection (e.g., modify various parameters of the established connection) with the base station based on any or all of the received instances of the first synchronization signal transmissions using the first and/or second beams. For example, the UE may perform beam management and/or time/frequency tracking for its established connection with the base station. This may include updating its active transmit/receive beam of the UE, transmitting an updated feedback report to the base station indicating parameters for the first and/or second transmit beams of the base station, updating its timing synchronization with the base station, updating its frequency synchronization with respect to the base station, and the like.

Figure 6:
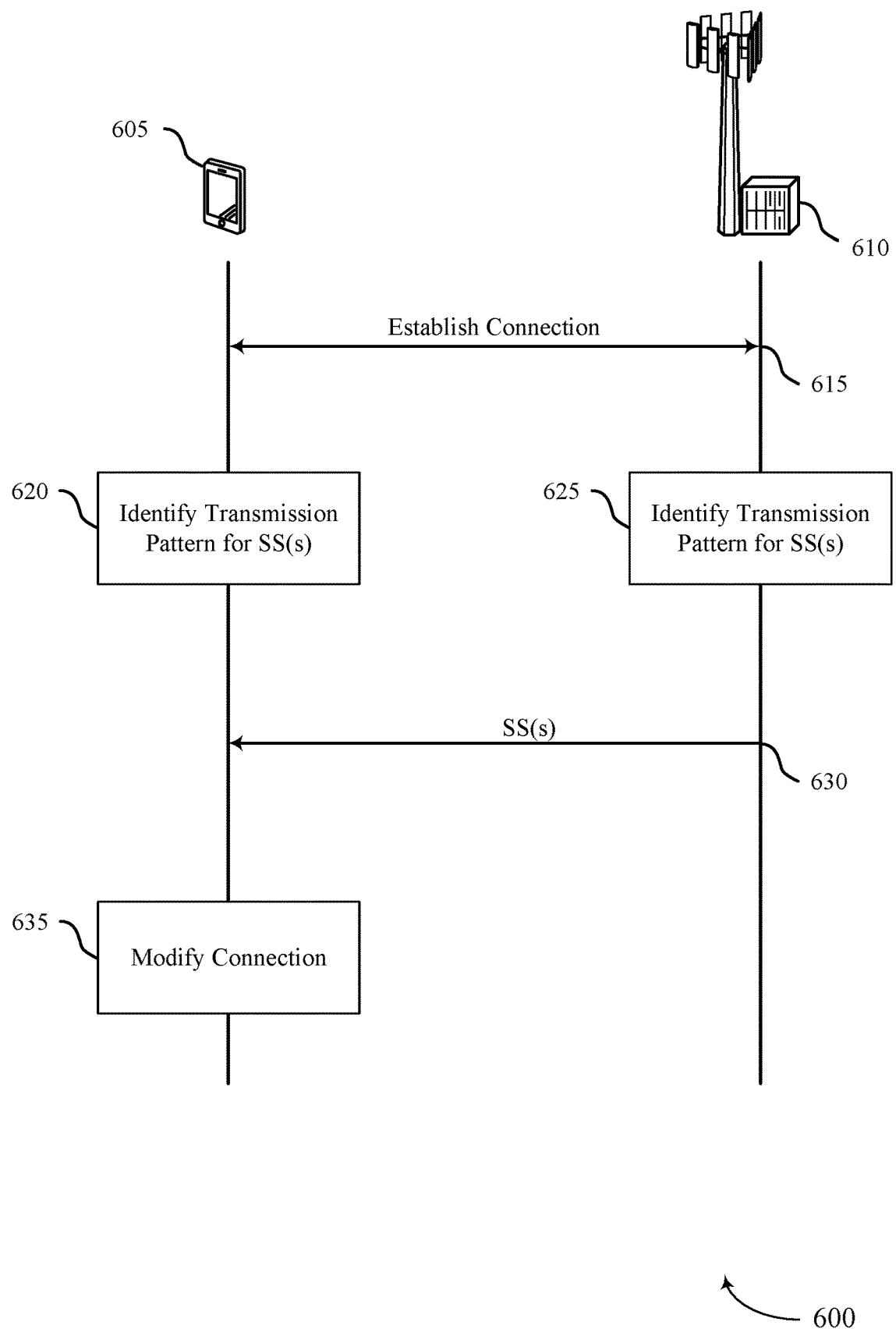
FIG. 6 illustrates an example of a process that supports periodic lean synchronization signal design in accordance with aspects of the present disclosure.

FIG. 6 illustrates an example of a process 600 that supports periodic lean synchronization signal design in accordance with aspects of the present disclosure. In some examples, process 600 may implement aspects of wireless communication systems 100 and/or 200, and/or lean SSB configurations 300, 400, and/or 500. Aspects of process 600 may be implemented by UE 605 and/or base station 610, which may be examples of the corresponding devices described herein.

At 615, UE 605 and base station 610 may establish a connection. The connection may be established based on an SSB of base station 610, such as a full SSB as illustrated in SSB 210 of FIG. 2. The connection may be established during an initial cell selection procedure or as part of a cell reselection procedure. The SSB may include at least a first synchronization signal (e.g., a PSS or SSS from the full SSB that is, at least to some extent, utilized in the lean SSB).

At 620, UE 605 may identify a configuration for a transmission pattern for a first synchronization signal (e.g., lean SSB) to be transmitted by base station 610. Similarly and at 625, base station 610 may also identify the configuration for the transmission pattern for the first synchronization signal (e.g., lean SSB). In some aspects, the configuration for the transmission pattern may be known by UE 605 and/or base station 610 (e.g., adopted in standards and implemented within the wireless communication system that UE 605 and/or base station 610 are operating in). In some aspects, the configuration of the transmission pattern may be configured by base station 610 for UE 605. For example, base station 610 may transmit (and UE 605 may receive) a configuration signal (e.g., an RRC signal, MAC CE, or the like) indicating the configuration for the transmission pattern. In some aspects, the configuration for the transmission pattern may be implicitly configured by base station 610. For example, base station 610 may configure UE 605 with a different reference signal, a resource set, or other configuration, that is associated with the configuration for the transmission pattern for the first synchronization signal transmissions.

At 630, base station 610 may transmit first synchronization signal(s) (e.g., lean SSB transmissions) according to the transmission pattern. Accordingly, UE 605 may receive one or more instances of the first synchronization signals according to the transmission pattern. In some aspects, transmission of the first synchronization signals according to the transmission pattern may be dynamically (e.g., DCI, MAC CE, etc.) and/or semi-statically (e.g., RRC signaling) activated/deactivated by base station 610. That is, base station 610 may turn lean SSB transmissions on or off for UE 605 using various signaling. In some aspects, UE 605 may request lean SSB transmissions from base station 610. For example, UE 605 may transmit (and base station 610 may receive) a signal requesting activation or deactivation of the lean SSB transmissions. In some examples, the UE request may indicate various parameters requested for the first synchronization signal transmissions.

As discussed, in some examples the first synchronization signal transmissions may utilize one or more beams (e.g., different transmit beams a base station 610). That is, one or more sets of first synchronization signal transmissions may be configured for UE 605, with each set using unique transmit beams or with different sets using the same transmit beam. As also discussed, the first synchronization signal transmissions (e.g., lean SSB transmission) according to the transmission pattern may be associated with various parameters, e.g., offsets, periodicity, etc. The configuration for the transmission pattern may indicate the parameters for the first synchronization signal transmissions.

Accordingly and at 635, UE 605 may modify the established connection with base station 610 based on the received one or more instances of the first synchronization signal (e.g., based on received instances of lean SSB transmissions from base station 610). For example, UE 605 may perform beam management, time tracking, frequency tracking, and the like, for its established connection with base station 610.

Figure 7:
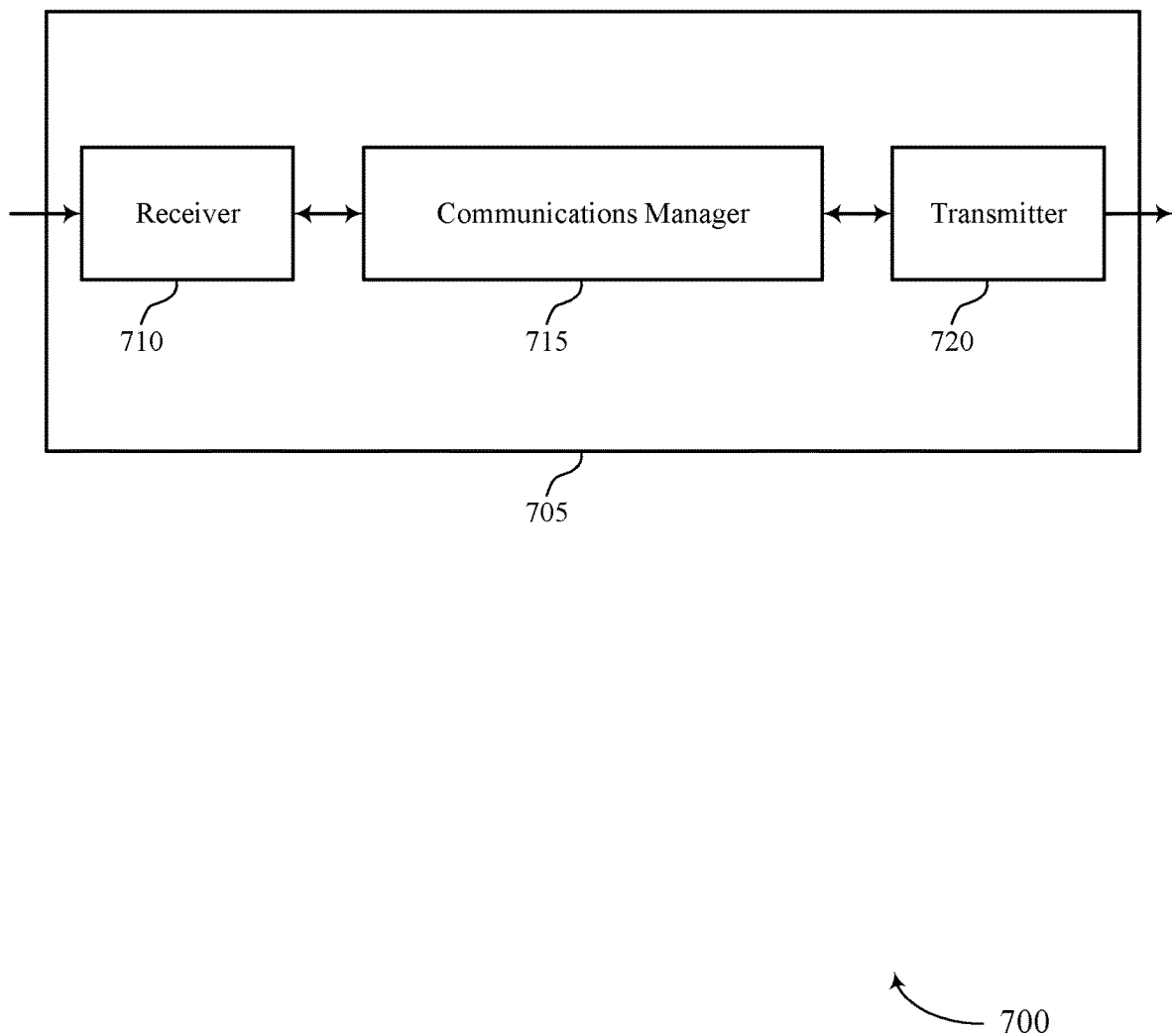
FIGS. 7 and 8 show block diagrams of devices that support periodic lean synchronization signal design in accordance with aspects of the present disclosure.

FIG. 7 shows a block diagram 700 of a device 705 that supports periodic lean synchronization signal design in accordance with aspects of the present disclosure. The device 705 may be an example of aspects of a UE 115 as described herein. The device 705 may include a receiver 710, a communications manager 715, and a transmitter 720.

The device 705 may also include a processor. Each of these components may be in communication with one another (e.g., via one or more buses).

The receiver 710 may receive information such as packets, user data, or control information associated with various information channels (e.g., control channels, data channels, and information related to periodic lean synchronization signal design, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may establish a connection with a base station based on a SSB from the base station, the SSB including at least a first synchronization signal, identify a configuration for a transmission pattern for a first synchronization signal to be transmitted by the base station, receive one or more instances of the first synchronization signal according to the transmission pattern for the first synchronization signal, and modify the established connection with the base station based on the received one or more instances of the first synchronization signal. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
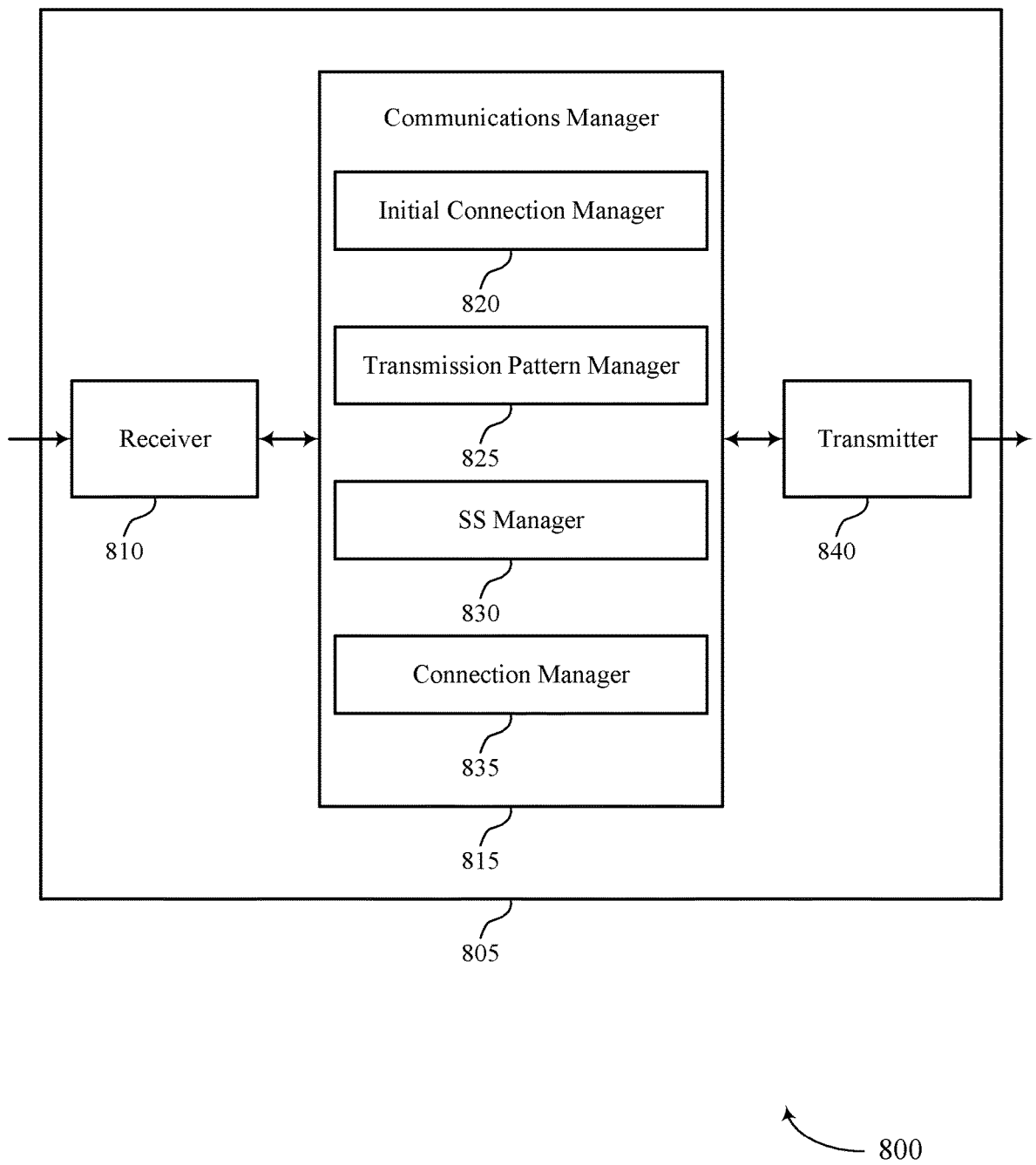

FIG. 8 shows a block diagram 800 of a device 805 that supports periodic lean synchronization signal design in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to periodic lean synchronization signal design, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an initial connection manager 820, a transmission pattern manager 825, a SS manager 830, and a connection manager 835. The communications manager 815 may be an example of aspects of the communications manager 1010 described herein.

The initial connection manager 820 may establish a connection with a base station based on a SSB from the base station, the SSB including at least a first synchronization signal.

The transmission pattern manager 825 may identify a configuration for a transmission pattern for the first synchronization signal to be transmitted by the base station.

The SS manager 830 may receive one or more instances of the first synchronization signal according to the transmission pattern for the first synchronization signal.

The connection manager 835 may modify the established connection with the base station based on the received one or more instances of the first synchronization signal.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
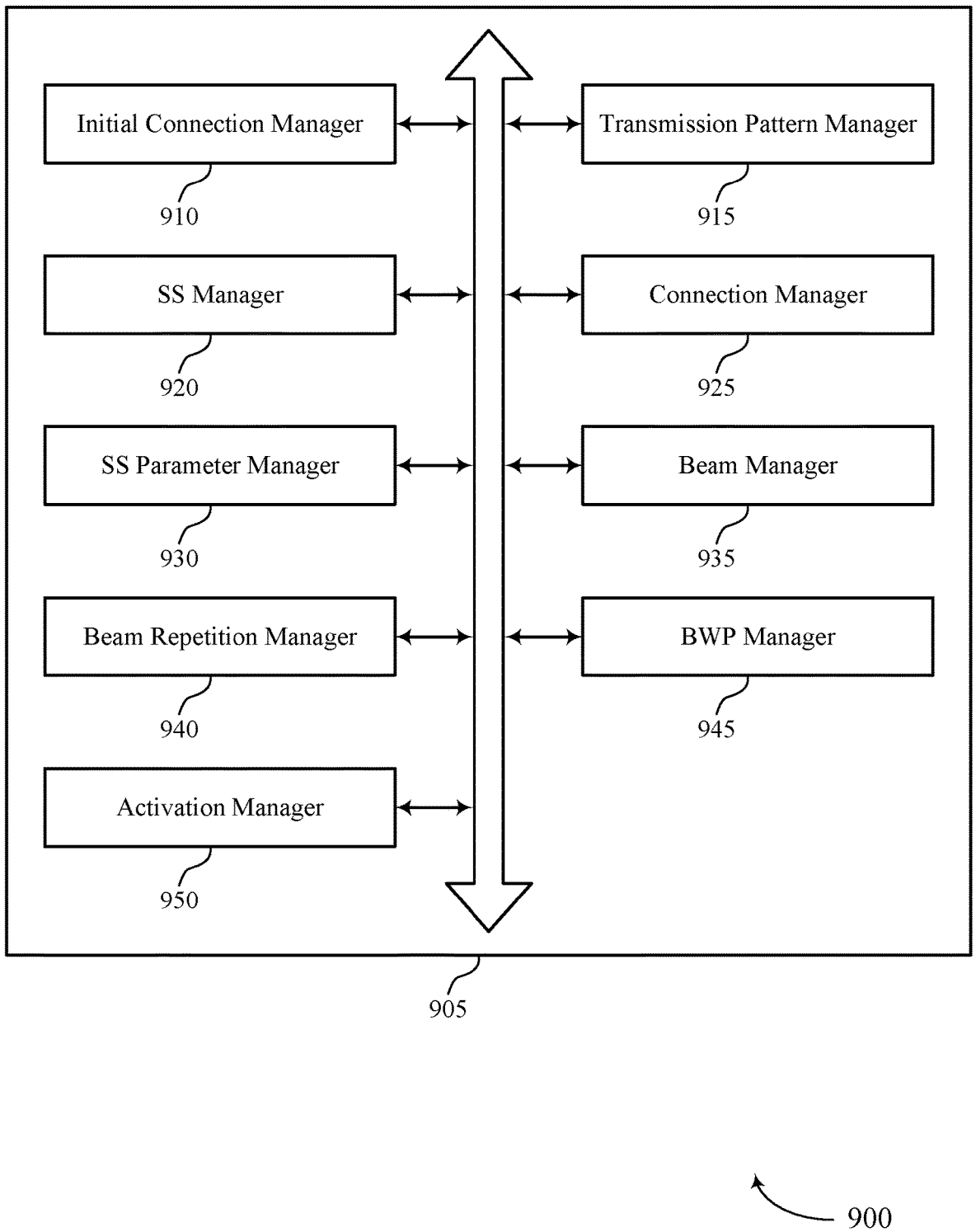
FIG. 9 shows a block diagram of a communications manager that supports periodic lean synchronization signal design in accordance with aspects of the present disclosure.

FIG. 9 shows a block diagram 900 of a communications manager 905 that supports periodic lean synchronization signal design in accordance with aspects of the present disclosure. The communications manager 905 may be an example of aspects of a communications manager 715, a communications manager 815, or a communications manager 1010 described herein. The communications manager 905 may include an initial connection manager 910, a transmission pattern manager 915, a SS manager 920, a connection manager 925, a SS parameter manager 930, a beam manager 935, a beam repetition manager 940, a BWP manager 945, and an activation manager 950. Each of these modules may communicate, directly or indirectly, with one another (e.g., via one or more buses).

The initial connection manager 910 may establish a connection with a base station based on a SSB from the base station, the SSB including at least a first synchronization signal.

The transmission pattern manager 915 may identify a configuration for a transmission pattern for a first synchronization signal to be transmitted by the base station. In some examples, the transmission pattern manager 915 may identify the configuration via at least one of a configuration adopted by the wireless communication system, or a configuration signal received from the base station, or an implicit indication associated with a different signal configured for the UE. In some examples, the transmission pattern manager 915 may determine, based on the configuration, that the transmission pattern for the first synchronization signal is UE-specific or cell-specific.

The SS manager 920 may receive one or more instances of the first synchronization signal according to the transmission pattern for the first synchronization signal.

The connection manager 925 may modify the established connection with the base station based on the received one or more instances of the first synchronization signal.

The SS parameter manager 930 may identify, based on the configuration for the transmission pattern, one or more parameters for the one or more instances of the first synchronization signal. In some examples, the SS parameter manager 930 may receive the one or more instances of the first synchronization signal according to the one or more parameters. In some cases, the one or more parameters include at least one of a slot periodicity within a transmission window for the first synchronization signal, a slot offset for a first slot including a first synchronization signal transmission within the transmission window, a symbol offset for the first synchronization signal transmission within a slot occurring within the transmission window, a symbol periodicity within a slot occurring within the transmission window, or a combination thereof.

The beam manager 935 may receive, based on the transmission pattern, a first one or more instances of the first synchronization signal associated with a first beam. In some examples, the beam manager 935 may receive, based on the transmission pattern, a second one or more instances of the first synchronization signal associated with a second beam that is different than the first beam. In some cases, the first beam and the second beam are associated with a same set of the one or more instances of the first synchronization signal. In some cases, the first beam and the second beam are associated with different sets of the one or more instances of the first synchronization signal. In some cases, the first beam and the second beam include transmit beams of the base station transmitting the first synchronization signals.

The beam repetition manager 940 may determine, based on the configuration, that beam repetition is enabled for first synchronization signal transmissions. In some examples, the beam repetition manager 940 may identify, based on beam repetition being enabled, a beam repetition pattern for receiving the one or more instances of the first synchronization signal. In some examples, the beam repetition manager 940 may receive the one or more instances of the first synchronization signal according to the beam repetition pattern.

The BWP manager 945 may identify, based on the configuration, a first bandwidth part for the first synchronization signal, where the first bandwidth part is different from a second bandwidth part for the SSB used to establish the connection.

The activation manager 950 may receive a signal activating or deactivating the one or more instances of the first synchronization signal according to the transmission pattern. In some examples, the activation manager 950 may transmit a signal requesting activation or deactivation of the one or more instances of the first synchronization signal according to the transmission pattern. In some cases, the signal includes at least one of an RRC signal, or a MAC CE, or a combination thereof. In some cases, the signal activates or deactivates the one or more instances of the first synchronization signal for at least one of the UE, or a group of UEs that include the UE, or for a bandwidth part, or for the base station, or a combination thereof. In some cases, the signal indicates one or more requested parameters for the one or more instances of the first synchronization signal.

Figure 10:
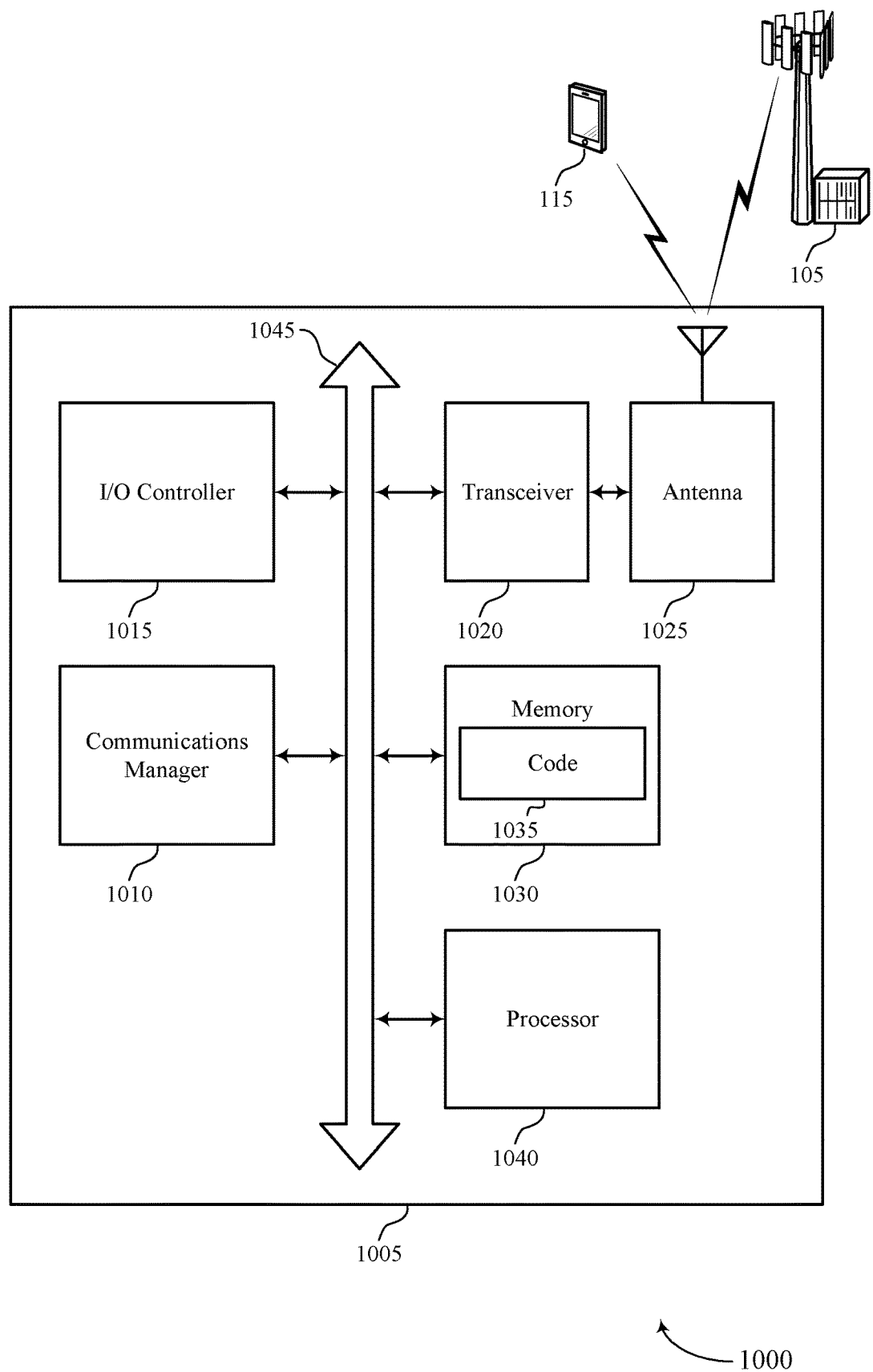
FIG. 10 shows a diagram of a system including a device that supports periodic lean synchronization signal design in accordance with aspects of the present disclosure.

FIG. 10 shows a diagram of a system 1000 including a device 1005 that supports periodic lean synchronization signal design in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may establish a connection with a base station based on a SSB from the base station, the SSB including at least a first synchronization signal, identify a configuration for a transmission pattern for the first synchronization signal to be transmitted by the base station, receive one or more instances of the first synchronization signal according to the transmission pattern for the first synchronization signal, and modify the established connection with the base station based on the received one or more instances of the first synchronization signal.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting periodic lean synchronization signal design).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
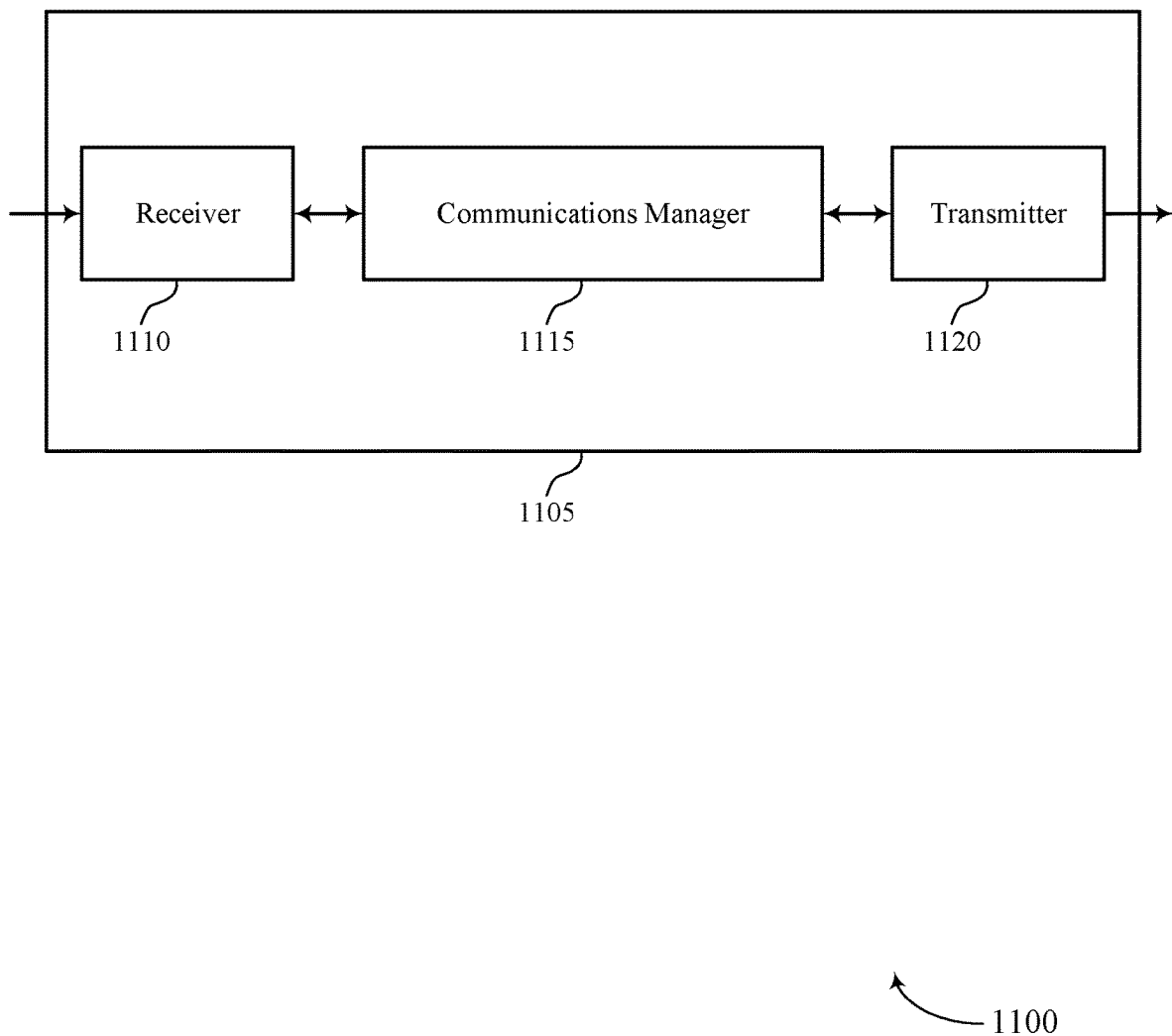
FIGS. 11 and 12 show block diagrams of devices that support periodic lean synchronization signal design in accordance with aspects of the present disclosure.

FIG. 11 shows a block diagram 1100 of a device 1105 that supports periodic lean synchronization signal design in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to periodic lean synchronization signal design, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may establish a connection with a UE based on a SSB from the base station, the SSB including at least a first synchronization signal, identify a configuration for a transmission pattern for the first synchronization signal to be transmitted by the base station, and transmit one or more instances of the first synchronization signal according to the transmission pattern for the first synchronization signal. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
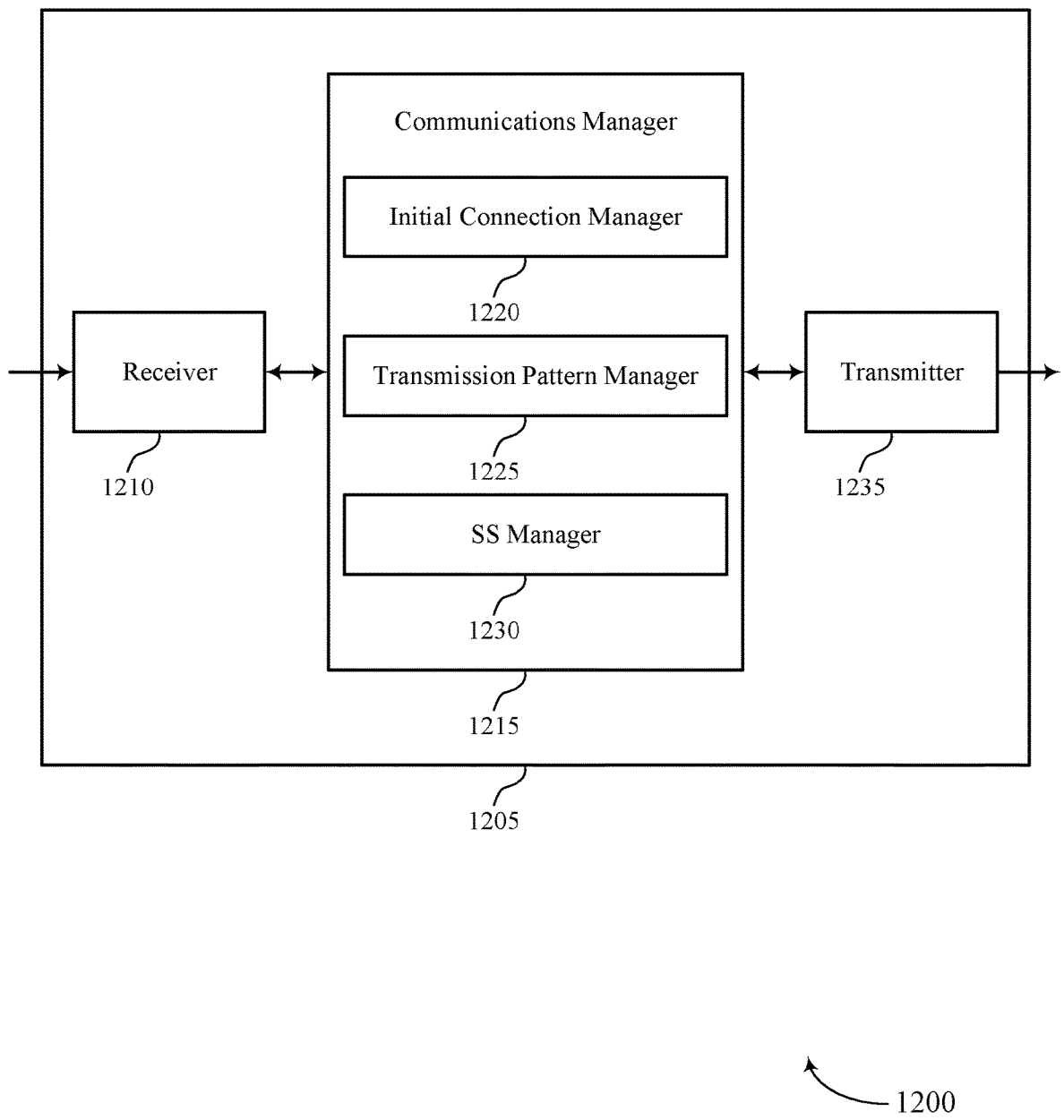

FIG. 12 shows a block diagram 1200 of a device 1205 that supports periodic lean synchronization signal design in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to periodic lean synchronization signal design, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an initial connection manager 1220, a transmission pattern manager 1225, and a SS manager 1230. The communications manager 1215 may be an example of aspects of the communications manager 1410 described herein.

The initial connection manager 1220 may establish a connection with a UE based on a SSB from the base station, the SSB including at least a first synchronization signal.

The transmission pattern manager 1225 may identify a configuration for a transmission pattern for the first synchronization signal to be transmitted by the base station.

The SS manager 1230 may transmit one or more instances of the first synchronization signal according to the transmission pattern for the first synchronization signal.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
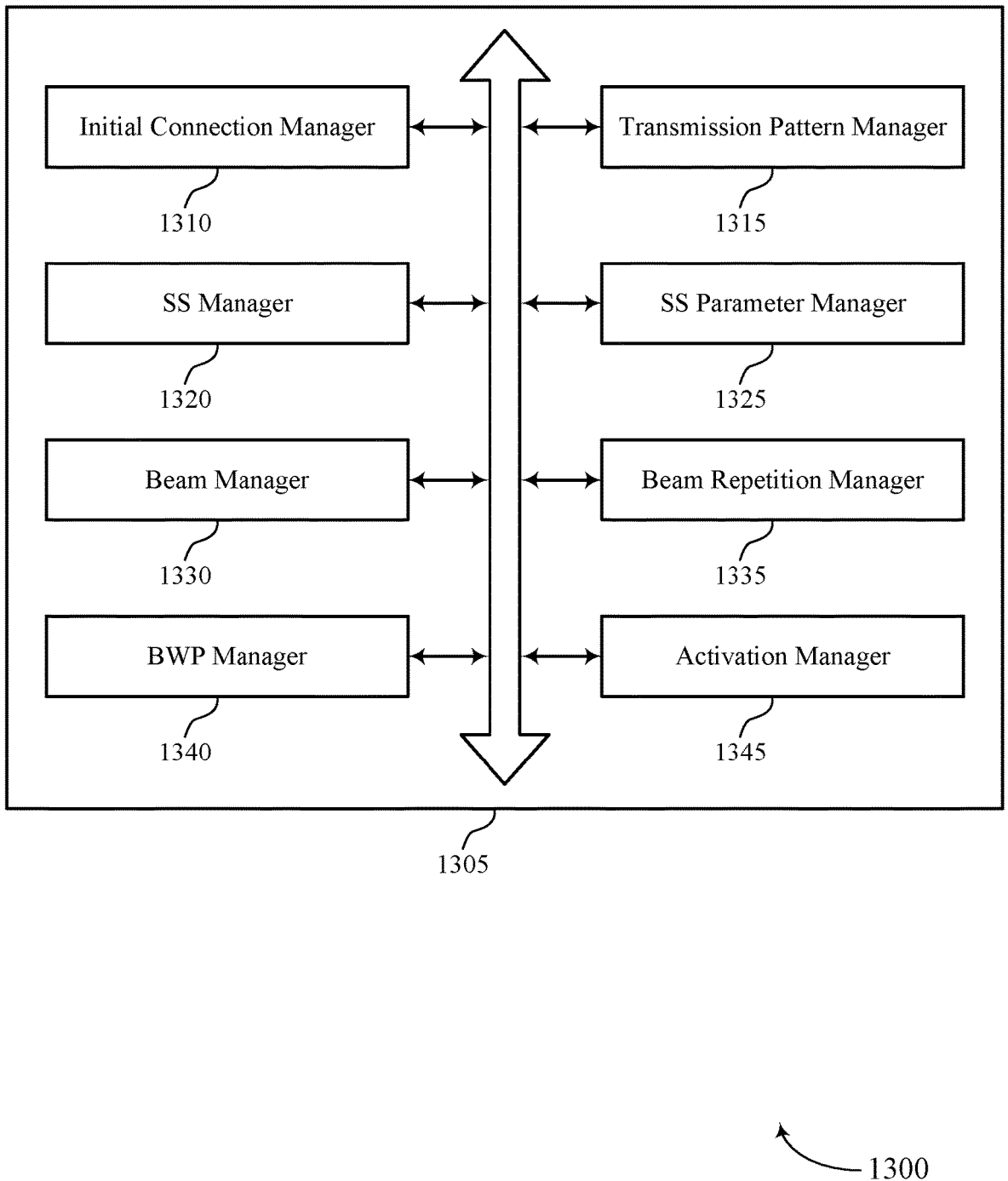
FIG. 13 shows a block diagram of a communications manager that supports periodic lean synchronization signal design in accordance with aspects of the present disclosure.

FIG. 13 shows a block diagram 1300 of a communications manager 1305 that supports periodic lean synchronization signal design in accordance with aspects of the present disclosure. The communications manager 1305 may be an example of aspects of a communications manager 1115, a communications manager 1215, or a communications manager 1410 described herein. The communications manager 1305 may include an initial connection manager 1310, a transmission pattern manager 1315, a SS manager 1320, a SS parameter manager 1325, a beam manager 1330, a beam repetition manager 1335, a BWP manager 1340, and an activation manager 1345. Each of these modules may communicate, directly or indirectly, with one another (e.g., via one or more buses).

The initial connection manager 1310 may establish a connection with a UE based on a SSB from the base station, the SSB including at least a first synchronization signal.

The transmission pattern manager 1315 may identify a configuration for a transmission pattern for the first synchronization signal to be transmitted by the base station. In some examples, the transmission pattern manager 1315 may identify the configuration via at least one of a configuration adopted by the wireless communication system, or a configuration signal transmitted from the base station, or an implicit indication associated with a different signal configured for the UE. In some examples, the transmission pattern manager 1315 may determine, based on the configuration, that the transmission pattern for the synchronization signal is UE-specific or cell-specific.

The SS manager 1320 may transmit one or more instances of the first synchronization signal according to the transmission pattern for the first synchronization signal.

The SS parameter manager 1325 may identify, based on the configuration for the transmission pattern, one or more parameters for the one or more instances of the first synchronization signal. In some examples, the SS parameter manager 1325 may transmit the one or more instances of the first synchronization signal according to the one or more parameters. In some cases, the one or more parameters include at least one of a slot periodicity within a transmission window for the first synchronization signal, a slot offset for a first slot including the first synchronization signal transmission within the transmission window, a symbol offset for the first synchronization signal transmission within a slot occurring within the transmission window, a symbol periodicity within a slot occurring within the transmission window, or a combination thereof.

The beam manager 1330 may transmit, based on the transmission pattern, a first one or more instances of the first synchronization signal associated with a first beam. In some examples, the beam manager 1330 may transmit, based on the transmission pattern, a second one or more instances of the first synchronization signal associated with a second beam that is different than the first beam. In some cases, the first beam and the second beam are associated with a same set of the one or more instances of the first synchronization signal. In some cases, the first beam and the second beam are associated with different sets of the one or more instances of the first synchronization signal. In some cases, the first beam and the second beam include transmit beams of the base station transmitting the first synchronization signals.

The beam repetition manager 1335 may determine, based on the configuration, that beam repetition is enabled for the first synchronization signal transmissions. In some examples, the beam repetition manager 1335 may identify, based on beam repetition being enabled, a beam repetition pattern for transmitting the one or more instances of the first synchronization signal. In some examples, the beam repetition manager 1335 may transmit the one or more instances of the first synchronization signal according to the beam repetition pattern.

The BWP manager 1340 may identify, based on the configuration, a first bandwidth part for the first synchronization signal, where the first bandwidth part is different from a second bandwidth part for the SSB used to establish the connection.

The activation manager 1345 may transmit a signal activating or deactivating the one or more instances of the first synchronization signal according to the transmission pattern. In some examples, the activation manager 1345 may receive a signal requesting activation or deactivation of the one or more instances of the first synchronization signal according to the transmission pattern. In some cases, the signal includes at least one of an RRC signal, or a MAC CE, or a combination thereof. In some cases, the signal activates or deactivates the one or more instances of the first synchronization signal for at least one of the UE, or a group of UEs that include the UE, or for a bandwidth part, or for the base station, or a combination thereof. In some cases, the signal indicates one or more requested parameters for the one or more instances of the first synchronization signal.

Figure 14:
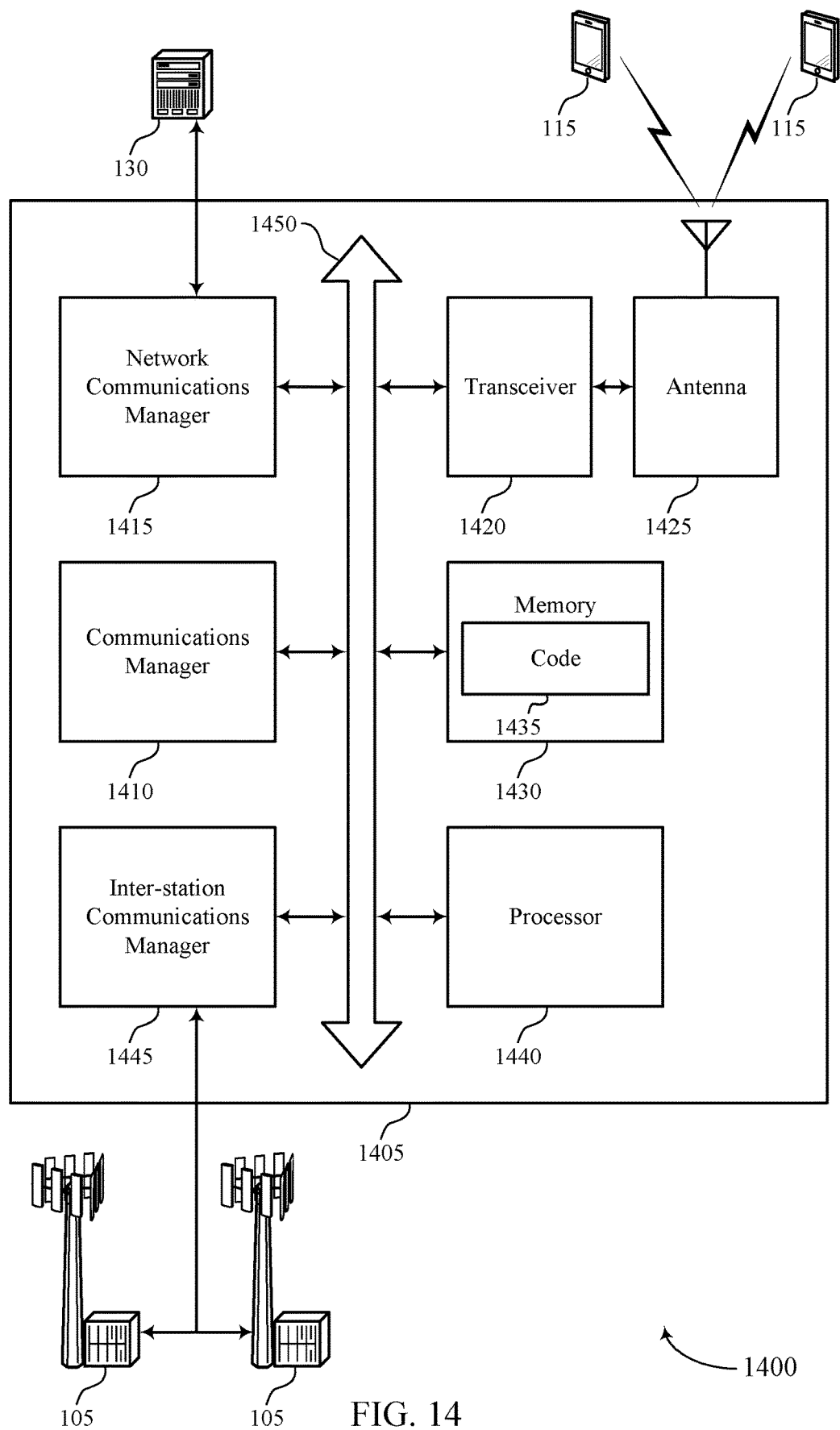
FIG. 14 shows a diagram of a system including a device that supports periodic lean synchronization signal design in accordance with aspects of the present disclosure.

FIG. 14 shows a diagram of a system 1400 including a device 1405 that supports periodic lean synchronization signal design in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may establish a connection with a UE based on a SSB from the base station, the SSB including at least a first synchronization signal, identify a configuration for a transmission pattern for the first synchronization signal to be transmitted by the base station, and transmit one or more instances of the first synchronization signal according to the transmission pattern for the first synchronization signal.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting periodic lean synchronization signal design).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
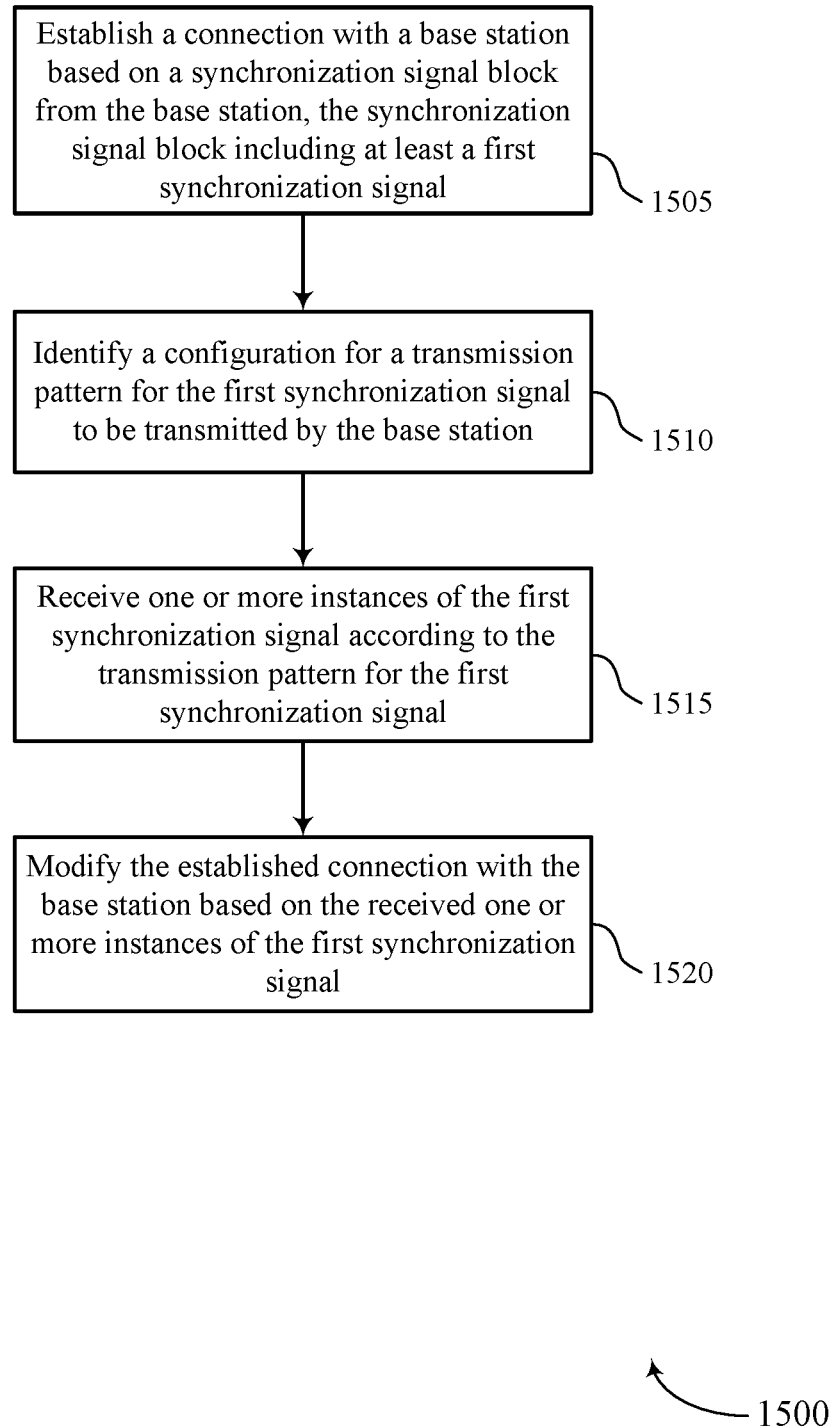
FIGS. 15 through 19 show flowcharts illustrating methods that support periodic lean synchronization signal design in accordance with aspects of the present disclosure.

FIG. 15 shows a flowchart illustrating a method 1500 that supports periodic lean synchronization signal design in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may establish a connection with a base station based on a SSB from the base station, the SSB including at least a first synchronization signal. The operations of 1505 may be performed according to the methods described herein. In some examples, aspects of the operations of 1505 may be performed by an initial connection manager as described with reference to FIGS. 7 through 10.

At 1510, the UE may identify a configuration for a transmission pattern for the first synchronization signal to be transmitted by the base station. The operations of 1510 may be performed according to the methods described herein. In some examples, aspects of the operations of 1510 may be performed by a transmission pattern manager as described with reference to FIGS. 7 through 10.

At 1515, the UE may receive one or more instances of the first synchronization signal according to the transmission pattern for the first synchronization signal. The operations of 1515 may be performed according to the methods described herein. In some examples, aspects of the operations of 1515 may be performed by a SS manager as described with reference to FIGS. 7 through 10.

At 1520, the UE may modify the established connection with the base station based on the received one or more instances of the first synchronization signal. The operations of 1520 may be performed according to the methods described herein. In some examples, aspects of the operations of 1520 may be performed by a connection manager as described with reference to FIGS. 7 through 10.

Figure 16:
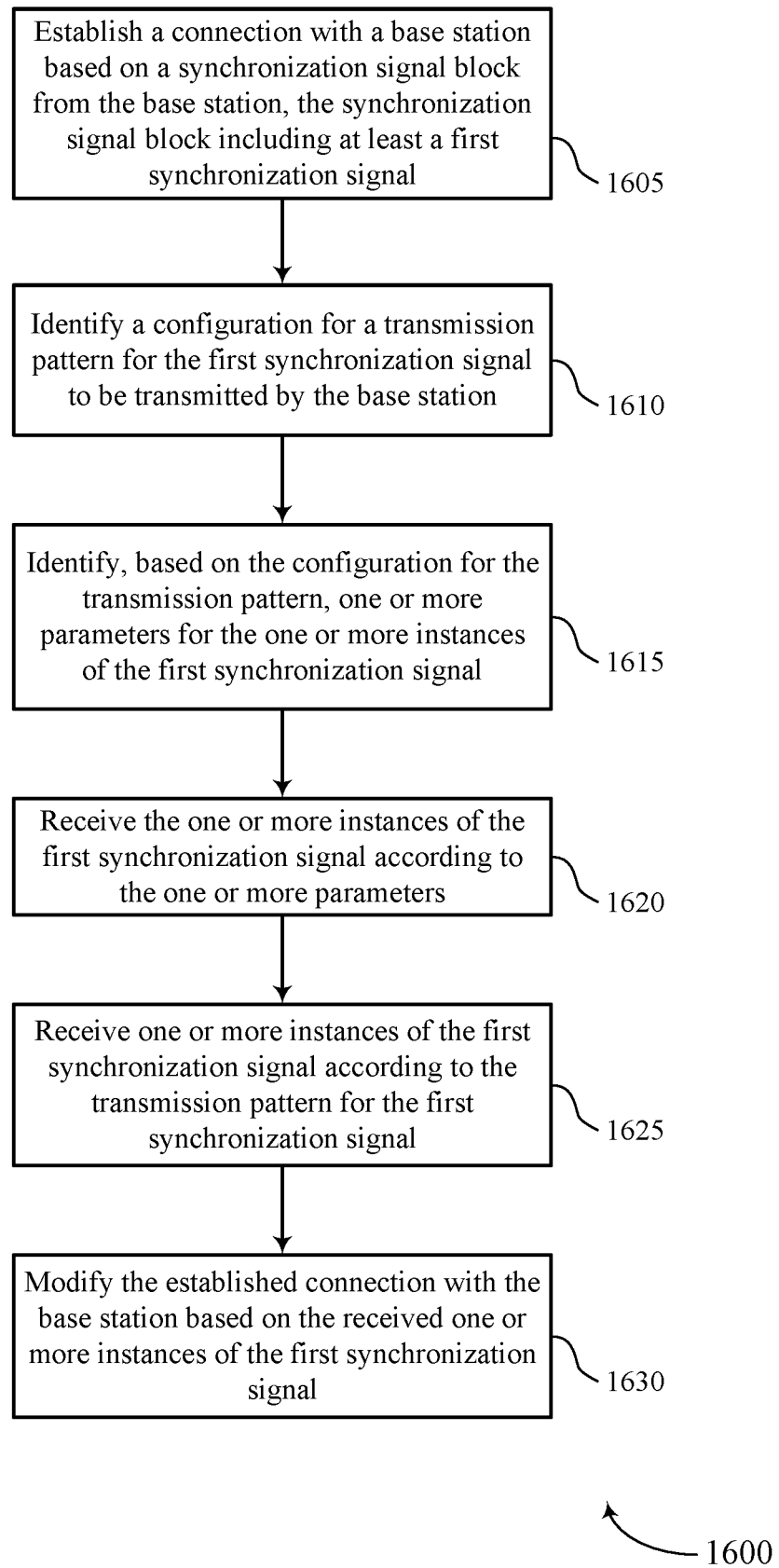

FIG. 16 shows a flowchart illustrating a method 1600 that supports periodic lean synchronization signal design in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may establish a connection with a base station based on a SSB from the base station, the SSB including at least a first synchronization signal. The operations of 1605 may be performed according to the methods described herein. In some examples, aspects of the operations of 1605 may be performed by an initial connection manager as described with reference to FIGS. 7 through 10.

At 1610, the UE may identify a configuration for a transmission pattern for the first synchronization signal to be transmitted by the base station. The operations of 1610 may be performed according to the methods described herein. In some examples, aspects of the operations of 1610 may be performed by a transmission pattern manager as described with reference to FIGS. 7 through 10.

At 1615, the UE may identify, based on the configuration for the transmission pattern, one or more parameters for the one or more instances of the first synchronization signal. The operations of 1615 may be performed according to the methods described herein. In some examples, aspects of the operations of 1615 may be performed by a SS parameter manager as described with reference to FIGS. 7 through 10.

At 1620, the UE may receive the one or more instances of the first synchronization signal according to the one or more parameters. The operations of 1620 may be performed according to the methods described herein. In some examples, aspects of the operations of 1620 may be performed by a SS parameter manager as described with reference to FIGS. 7 through 10.

At 1625, the UE may receive one or more instances of the first synchronization signal according to the transmission pattern for the first synchronization signal. The operations of 1625 may be performed according to the methods described herein. In some examples, aspects of the operations of 1625 may be performed by a SS manager as described with reference to FIGS. 7 through 10.

At 1630, the UE may modify the established connection with the base station based on the received one or more instances of the first synchronization signal. The operations of 1630 may be performed according to the methods described herein. In some examples, aspects of the operations of 1630 may be performed by a connection manager as described with reference to FIGS. 7 through 10.

Figure 17:
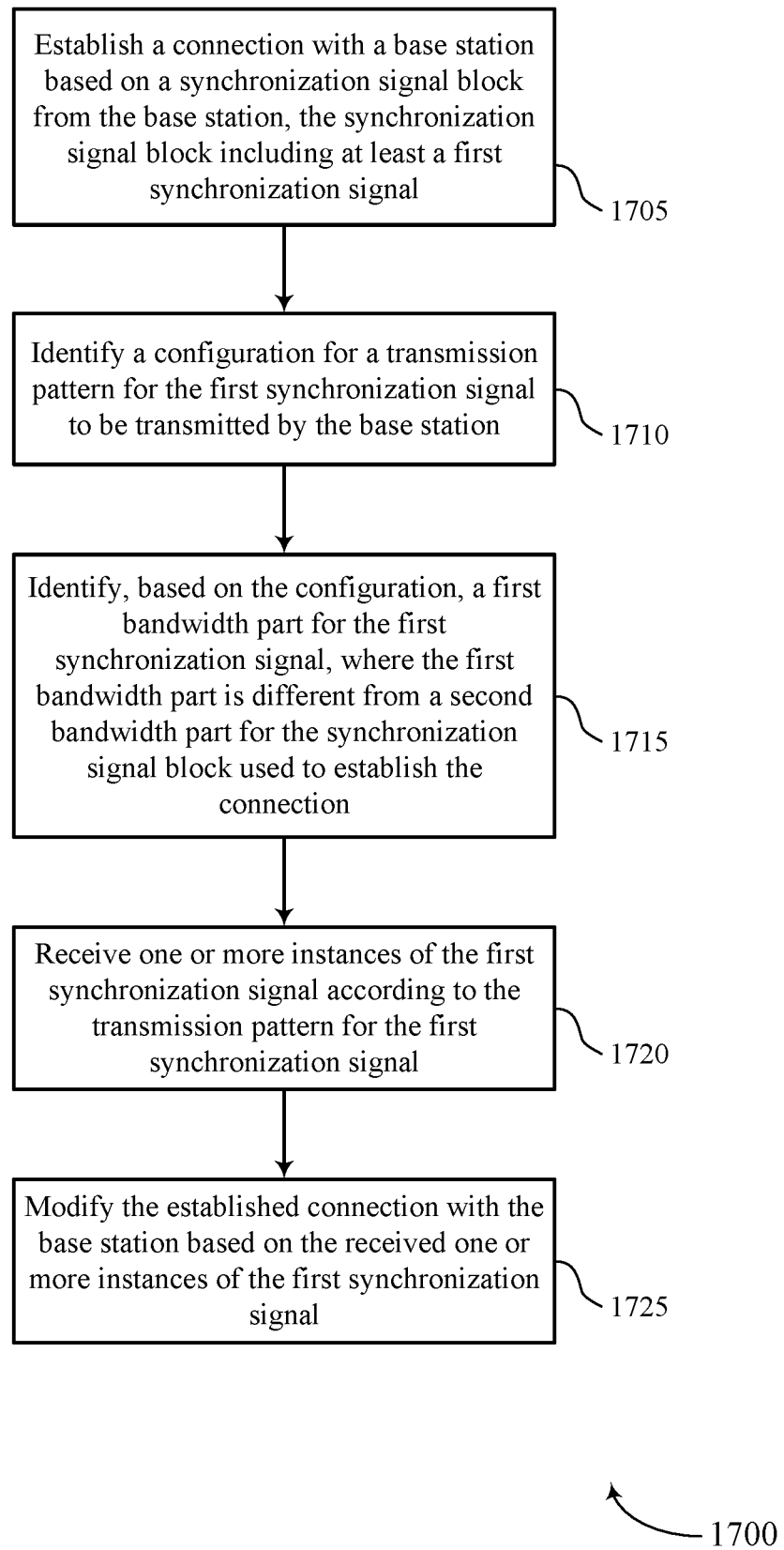

FIG. 17 shows a flowchart illustrating a method 1700 that supports periodic lean synchronization signal design in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may establish a connection with a base station based on a SSB from the base station, the SSB including at least a first synchronization signal. The operations of 1705 may be performed according to the methods described herein. In some examples, aspects of the operations of 1705 may be performed by an initial connection manager as described with reference to FIGS. 7 through 10.

At 1710, the UE may identify a configuration for a transmission pattern for the first synchronization signal to be transmitted by the base station. The operations of 1710 may be performed according to the methods described herein. In some examples, aspects of the operations of 1710 may be performed by a transmission pattern manager as described with reference to FIGS. 7 through 10.

At 1715, the UE may identify, based on the configuration, a first bandwidth part for the first synchronization signal, where the first bandwidth part is different from a second bandwidth part for the SSB used to establish the connection. The operations of 1715 may be performed according to the methods described herein. In some examples, aspects of the operations of 1715 may be performed by a BWP manager as described with reference to FIGS. 7 through 10.

At 1720, the UE may receive one or more instances of the first synchronization signal according to the transmission pattern for the first synchronization signal. The operations of 1720 may be performed according to the methods described herein. In some examples, aspects of the operations of 1720 may be performed by a SS manager as described with reference to FIGS. 7 through 10.

At 1725, the UE may modify the established connection with the base station based on the received one or more instances of the first synchronization signal. The operations of 1725 may be performed according to the methods described herein. In some examples, aspects of the operations of 1725 may be performed by a connection manager as described with reference to FIGS. 7 through 10.

Figure 18:
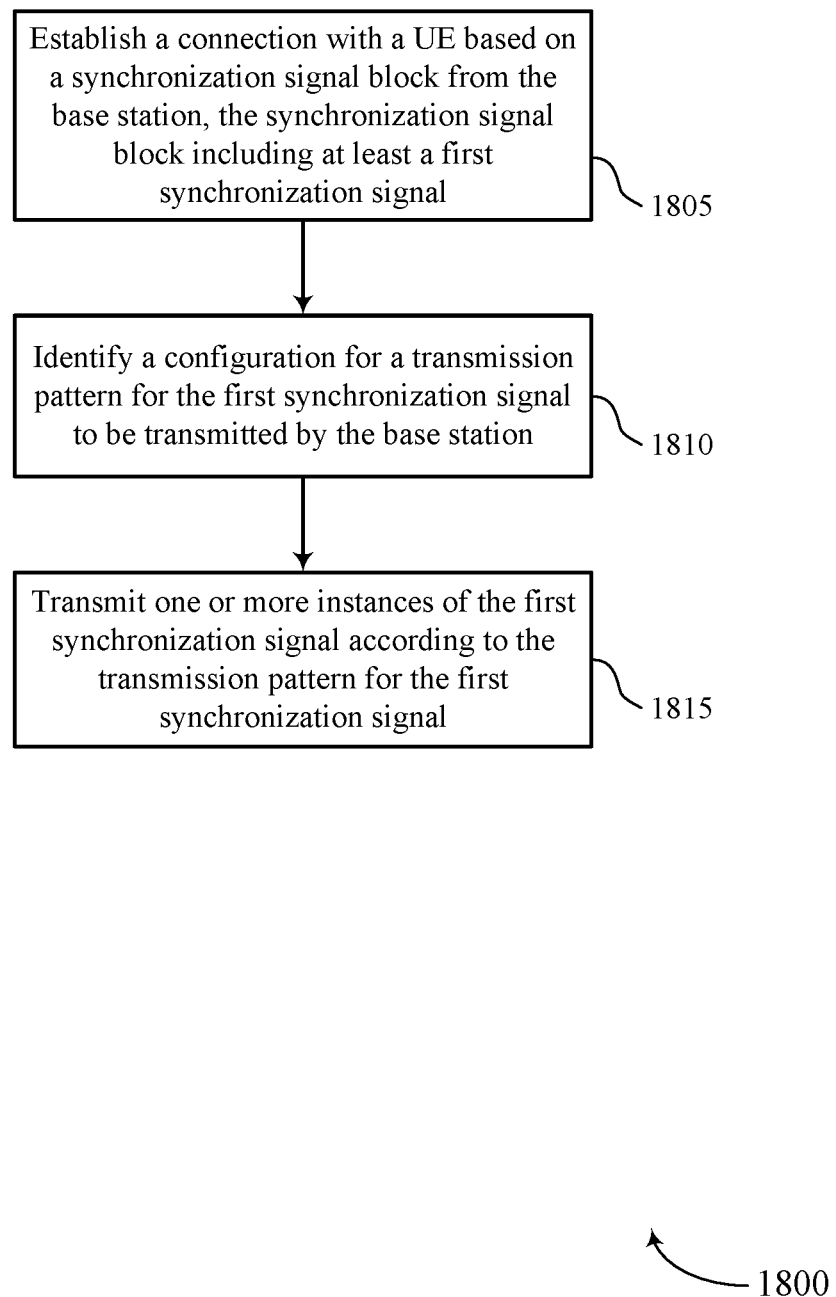

FIG. 18 shows a flowchart illustrating a method 1800 that supports periodic lean synchronization signal design in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may establish a connection with a UE based on a SSB from the base station, the SSB including at least a first synchronization signal. The operations of 1805 may be performed according to the methods described herein. In some examples, aspects of the operations of 1805 may be performed by an initial connection manager as described with reference to FIGS. 11 through 14.

At 1810, the base station may identify a configuration for a transmission pattern for the first synchronization signal to be transmitted by the base station. The operations of 1810 may be performed according to the methods described herein. In some examples, aspects of the operations of 1810 may be performed by a transmission pattern manager as described with reference to FIGS. 11 through 14.

At 1815, the base station may transmit one or more instances of the first synchronization signal according to the transmission pattern for the first synchronization signal. The operations of 1815 may be performed according to the methods described herein. In some examples, aspects of the operations of 1815 may be performed by a SS manager as described with reference to FIGS. 11 through 14.

Figure 19:
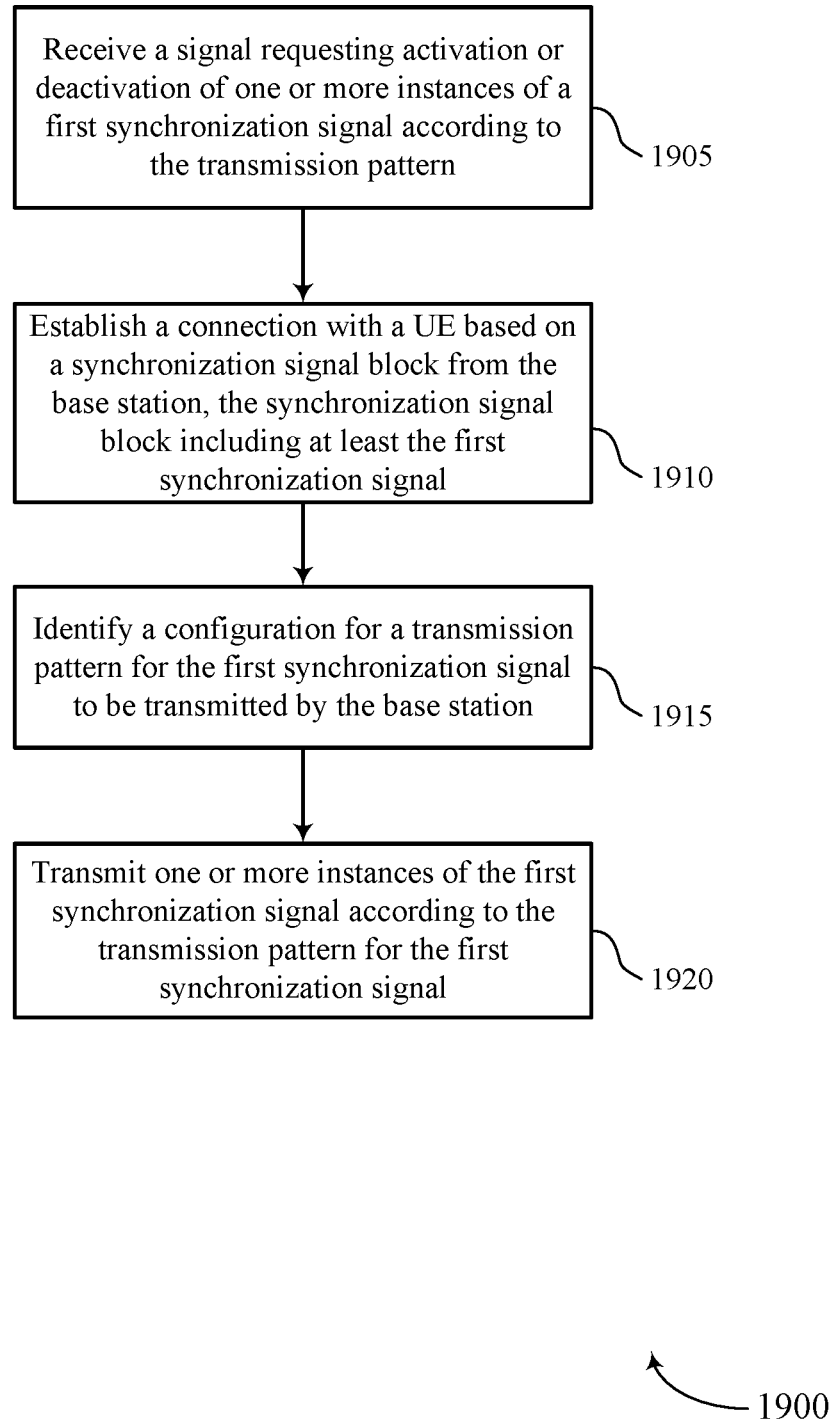

FIG. 19 shows a flowchart illustrating a method 1900 that supports periodic lean synchronization signal design in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may receive a signal requesting activation or deactivation of the one or more instances of a first synchronization signal according to the transmission pattern. The operations of 1905 may be performed according to the methods described herein. In some examples, aspects of the operations of 1905 may be performed by an activation manager as described with reference to FIGS. 11 through 14.

At 1910, the base station may establish a connection with a UE based on a SSB from the base station, the SSB including at least the first synchronization signal. The operations of 1910 may be performed according to the methods described herein. In some examples, aspects of the operations of 1910 may be performed by an initial connection manager as described with reference to FIGS. 11 through 14.

At 1915, the base station may identify a configuration for a transmission pattern for the first synchronization signal to be transmitted by the base station. The operations of 1915 may be performed according to the methods described herein. In some examples, aspects of the operations of 1915 may be performed by a transmission pattern manager as described with reference to FIGS. 11 through 14.

At 1920, the base station may transmit one or more instances of the first synchronization signal according to the transmission pattern for the first synchronization signal. The operations of 1920 may be performed according to the methods described herein. In some examples, aspects of the operations of 1920 may be performed by a SS manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: establishing a connection with a base station based at least in part on a SSB from the base station, wherein the SSB comprises at least a first synchronization signal; identifying a configuration for a transmission pattern for the first synchronization signal to be transmitted by the base station; receiving one or more instances of the first synchronization signal according to the transmission pattern for the synchronization signal; and modifying the established connection with the base station based at least in part on the received one or more instances of the first synchronization signal.

Aspect 2: The method of aspect 1, further comprising: identifying, based at least in part on the configuration for the transmission pattern, one or more parameters for the one or more instances of the first synchronization signal; and receiving the one or more instances of the first synchronization signal according to the one or more parameters.

Aspect 3: The method of aspect 2, wherein the one or more parameters comprise at least one of a slot periodicity within a transmission window for the first synchronization signal, a slot offset for a first slot comprising the first synchronization signal transmission within the transmission window, a symbol offset for the first synchronization signal transmission within a slot occurring within the transmission window, a symbol periodicity within a slot occurring within the transmission window, or a combination thereof.

Aspect 4: The method of any of aspects 1 through 3, further comprising: receiving, based at least in part on the transmission pattern, a first one or more instances of the first synchronization signal associated with a first beam; and receiving, based at least in part on the transmission pattern, a second one or more instances of the first synchronization signal associated with a second beam that is different than the first beam.

Aspect 5: The method of aspect 4, wherein the first beam and the second beam are associated with a same set of the one or more instances of the first synchronization signal.

Aspect 6: The method of any of aspects 4 through 5, wherein the first beam and the second beam are associated with different sets of the one or more instances of the first synchronization signal.

Aspect 7: The method of any of aspects 4 through 6, wherein the first beam and the second beam comprise transmit beams of the base station transmitting the first synchronization signals.

Aspect 8: The method of any of aspects 1 through 7, further comprising: determining, based at least in part on the configuration, that beam repetition is enabled for synchronization signal transmissions; identifying, based at least in part on beam repetition being enabled, a beam repetition pattern for receiving the one or more instances of the first synchronization signal; and receiving the one or more instances of the first synchronization signal according to the beam repetition pattern.

Aspect 9: The method of any of aspects 1 through 8, wherein identifying the configuration comprises: identifying the configuration via at least one of a configuration adopted by the wireless communication system, or a configuration signal received from the base station, or an implicit indication associated with a different signal configured for the UE.

Aspect 10: The method of any of aspects 1 through 9, further comprising: identifying, based at least in part on the configuration, a first bandwidth part for the first synchronization signal, wherein the first bandwidth part is different from a second bandwidth part for the SSB used to establish the connection.

Aspect 11: The method of any of aspects 1 through 10, further comprising: determining, based at least in part on the configuration, that the transmission pattern for the first synchronization signal is UE-specific or cell-specific.

Aspect 12: The method of any of aspects 1 through 11, further comprising: receiving a signal activating or deactivating the one or more instances of the first synchronization signal according to the transmission pattern.

Aspect 13: The method of aspect 12, wherein the signal comprises at least one of an RRC signal, or a MAC CE, or a combination thereof.

Aspect 14: The method of any of aspects 12 through 13, wherein the signal activates or deactivates the one or more instances of the first synchronization signal for at least one of the UE, or a group of UEs that include the UE, or for a bandwidth part, or for the base station, or a combination thereof.

Aspect 15: The method of any of aspects 1 through 14, further comprising: transmitting a signal requesting activation or deactivation of the one or more instances of the first synchronization signal according to the transmission pattern.

Aspect 16: The method of aspect 15, wherein the signal indicates one or more requested parameters for the one or more instances of the first synchronization signal.

Aspect 17: A method for wireless communication at a base station, comprising: establishing a connection with a UE based at least in part on a SSB from the base station, wherein the SSB comprises at least a first synchronization signal; identifying a configuration for a transmission pattern for the first synchronization signal to be transmitted by the base station; and transmitting one or more instances of the first synchronization signal according to the transmission pattern for the first synchronization signal.

Aspect 18: The method of aspect 17, further comprising: identifying, based at least in part on the configuration for the transmission pattern, one or more parameters for the one or more instances of the first synchronization signal; and transmitting the one or more instances of the first synchronization signal according to the one or more parameters.

Aspect 19: The method of aspect 18, wherein the one or more parameters comprise at least one of a slot periodicity within a transmission window for the first synchronization signal, a slot offset for a first slot comprising the first synchronization signal transmission within the transmission window, a symbol offset for the first synchronization signal transmission within a slot occurring within the transmission window, a symbol periodicity within a slot occurring within the transmission window, or a combination thereof.

Aspect 20: The method of any of aspects 17 through 19, further comprising: transmitting, based at least in part on the transmission pattern, a first one or more instances of the first synchronization signal associated with a first beam; and transmitting, based at least in part on the transmission pattern, a second one or more instances of the first synchronization signal associated with a second beam that is different than the first beam.

Aspect 21: The method of aspect 20, wherein the first beam and the second beam are associated with a same set of the one or more instances of the first synchronization signal.

Aspect 22: The method of any of aspects 20 through 21, wherein the first beam and the second beam are associated with different sets of the one or more instances of the first synchronization signal.

Aspect 23: The method of any of aspects 20 through 22, wherein the first beam and the second beam comprise transmit beams of the base station transmitting the first synchronization signals.

Aspect 24: The method of any of aspects 17 through 23, further comprising: determining, based at least in part on the configuration, that beam repetition is enabled for synchronization signal transmissions; identifying, based at least in part on beam repetition being enabled, a beam repetition pattern for transmitting the one or more instances of the first synchronization signal; and transmitting the one or more instances of the first synchronization signal according to the beam repetition pattern.

Aspect 25: The method of any of aspects 17 through 24, wherein identifying the configuration comprises: identifying the configuration via at least one of a configuration adopted by the wireless communication system, or a configuration signal transmitted from the base station, or an implicit indication associated with a different signal configured for the UE.

Aspect 26: The method of any of aspects 17 through 25, further comprising: identifying, based at least in part on the configuration, a first bandwidth part for the first synchronization signal, wherein the first bandwidth part is different from a second bandwidth part for the SSB used to establish the connection.

Aspect 27: The method of any of aspects 17 through 26, further comprising: determining, based at least in part on the configuration, that the transmission pattern for the first synchronization signal is UE-specific or cell-specific.

Aspect 28: The method of any of aspects 17 through 27, further comprising: transmitting a signal activating or deactivating the one or more instances of the first synchronization signal according to the transmission pattern.

Aspect 29: The method of aspect 28, wherein the signal comprises at least one of an RRC signal, or a MAC CE, or a combination thereof.

Aspect 30: The method of any of aspects 28 through 29, wherein the signal activates or deactivates the one or more instances of the first synchronization signal for at least one of the UE, or a group of UEs that include the UE, or for a bandwidth part, or for the base station, or a combination thereof.

Aspect 31: The method of any of aspects 17 through 30, further comprising: receiving a signal requesting activation or deactivation of the one or more instances of the first synchronization signal according to the transmission pattern.

Aspect 32: The method of aspect 31, wherein the signal indicates one or more requested parameters for the one or more instances of the first synchronization signal.

Aspect 33: An apparatus for wireless communication at a UE, comprising a processor; memory coupled with the processor; and instructions stored in the memory and executable by the processor to cause the apparatus to perform a method of any of aspects 1 through 16.

Aspect 34: An apparatus for wireless communication at a UE, comprising at least one means for performing a method of any of aspects 1 through 16.

Aspect 35: A non-transitory computer-readable medium storing code for wireless communication at a UE, the code comprising instructions executable by a processor to perform a method of any of aspects 1 through 16.

Aspect 36: An apparatus for wireless communication at a base station, comprising a processor; memory coupled with the processor; and instructions stored in the memory and executable by the processor to cause the apparatus to perform a method of any of aspects 17 through 32.

Aspect 37: An apparatus for wireless communication at a base station, comprising at least one means for performing a method of any of aspects 17 through 32.

Aspect 38: A non-transitory computer-readable medium storing code for wireless communication at a base station, the code comprising instructions executable by a processor to perform a method of any of aspects 17 through 32.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a connection with a base station based at least in part on a synchronization signal block from the base station, wherein the synchronization signal block comprises at least a first synchronization signal;
    identifying a configuration for a transmission pattern for the first synchronization signal to be transmitted by the base station;
    receiving one or more instances of the first synchronization signal according to the transmission pattern for the first synchronization signal; and
    modifying the established connection with the base station based at least in part on the received one or more instances of the first synchronization signal.

2. The method of claim 1, further comprising:
    identifying, based at least in part on the configuration for the transmission pattern, one or more parameters for the one or more instances of the first synchronization signal; and
    receiving the one or more instances of the first synchronization signal according to the one or more parameters.

3. The method of claim 2, wherein the one or more parameters comprise at least one of a slot periodicity within a transmission window for the first synchronization signal, a slot offset for a first slot comprising the first synchronization signal within the transmission window, a symbol offset for the first synchronization signal within a slot occurring within the transmission window, a symbol periodicity within the slot occurring within the transmission window, or a combination thereof.

4. The method of claim 1, further comprising:
    receiving, based at least in part on the transmission pattern, a first one or more instances of the first synchronization signal associated with a first beam; and
    receiving, based at least in part on the transmission pattern, a second one or more instances of the first synchronization signal associated with a second beam that is different than the first beam.

5. The method of claim 1, further comprising:
    determining, based at least in part on the configuration, that beam repetition is enabled for synchronization signal transmissions;
    identifying, based at least in part on beam repetition being enabled, a beam repetition pattern for receiving the one or more instances of the first synchronization signal; and
    receiving the one or more instances of the first synchronization signal according to the beam repetition pattern.

6. The method of claim 1, wherein identifying the configuration comprises:
    identifying the configuration via at least one of a configuration adopted by a wireless communication system, or a configuration signal received from the base station, or an implicit indication associated with a different signal configured for the UE.

7. The method of claim 1, further comprising:
    identifying, based at least in part on the configuration, a first bandwidth part for the first synchronization signal, wherein the first bandwidth part is different from a second bandwidth part for the synchronization signal block used to establish the connection.

8. The method of claim 1, further comprising:
    determining, based at least in part on the configuration, that the transmission pattern for the first synchronization signal is UE-specific or cell-specific.

9. The method of claim 1, further comprising:
    receiving a signal activating or deactivating the one or more instances of the first synchronization signal according to the transmission pattern.

10. The method of claim 9, wherein the signal comprises at least one of a radio resource control (RRC) signal, or a medium access control (MAC) control element (CE), or a combination thereof.

11. The method of claim 9, wherein the signal activates or deactivates the one or more instances of the first synchronization signal for at least one of the UE, or a group of UEs that include the UE, or for a bandwidth part, or for the base station, or a combination thereof.

12. The method of claim 1, further comprising:
    transmitting a signal requesting activation or deactivation of the one or more instances of the first synchronization signal according to the transmission pattern.

13. The method of claim 12, wherein the signal indicates one or more requested parameters for the one or more instances of the first synchronization signal.

14. The method of claim 1, wherein the synchronization signal block comprises a primary synchronization signal, a secondary synchronization signal, and a physical broadcast channel, and the first synchronization signal is the primary synchronization signal or the secondary synchronization signal.

15. A method for wireless communication at a base station, comprising:
   establishing a connection with a user equipment (UE) based at least in part on a synchronization signal block from the base station, wherein the synchronization signal block comprises at least a first synchronization signal;
   identifying a configuration for a transmission pattern for the first synchronization signal to be transmitted by the base station; and
   transmitting one or more instances of the first synchronization signal according to the transmission pattern for the first synchronization signal.

16. The method of claim 15, further comprising:
   identifying, based at least in part on the configuration for the transmission pattern, one or more parameters for the one or more instances of the first synchronization signal; and
   transmitting the one or more instances of the first synchronization signal according to the one or more parameters.

17. The method of claim 16, wherein the one or more parameters comprise at least one of a slot periodicity within a transmission window for the first synchronization signal, a slot offset for a first slot comprising the first synchronization signal within the transmission window, a symbol offset for the first synchronization signal within a slot occurring within the transmission window, a symbol periodicity within the slot occurring within the transmission window, or a combination thereof.

18. The method of claim 15, further comprising:
   transmitting, based at least in part on the transmission pattern, a first one or more instances of the first synchronization signal associated with a first beam; and
   transmitting, based at least in part on the transmission pattern, a second one or more instances of the first synchronization signal associated with a second beam that is different than the first beam.

19. The method of claim 15, further comprising:
   determining, based at least in part on the configuration, that beam repetition is enabled for synchronization signal transmissions;
   identifying, based at least in part on beam repetition being enabled, a beam repetition pattern for transmitting the one or more instances of the first synchronization signal; and
   transmitting the one or more instances of the first synchronization signal according to the beam repetition pattern.

20. The method of claim 15, wherein identifying the configuration comprises:
   identifying the configuration via at least one of a configuration adopted by a wireless communication system, or a configuration signal transmitted from the base station, or an implicit indication associated with a different signal configured for the UE.

21. The method of claim 15, further comprising:
   identifying, based at least in part on the configuration, a first bandwidth part for the first synchronization signal, wherein the first bandwidth part is different from a second bandwidth part for the synchronization signal block used to establish the connection.

22. The method of claim 15, further comprising:
   determining, based at least in part on the configuration, that the transmission pattern for the first synchronization signal is UE-specific or cell-specific.

23. The method of claim 15, further comprising:
   transmitting a signal activating or deactivating the one or more instances of the first synchronization signal according to the transmission pattern.

24. The method of claim 23, wherein the signal comprises at least one of a radio resource control (RRC) signal, or a medium access control (MAC) control element (CE), or a combination thereof.

25. The method of claim 23, wherein the signal activates or deactivates the one or more instances of the first synchronization signal for at least one of the UE, or a group of UEs that include the UE, or for a bandwidth part, or for the base station, or a combination thereof.

26. The method of claim 15, further comprising:
   receiving a signal requesting activation or deactivation of the one or more instances of the first synchronization signal according to the transmission pattern, wherein the signal indicates one or more requested parameters for the one or more instances of the first synchronization signal.

27. An apparatus for wireless communication at a user equipment (UE), comprising:
   a processor,
   memory coupled with the processor; and
   instructions stored in the memory and executable by the processor to cause the apparatus to:
      establish a connection with a base station based at least in part on a synchronization signal block from the base station, wherein the synchronization signal block comprises at least a first synchronization signal;
      identify a configuration for a transmission pattern for the first synchronization signal to be transmitted by the base station;
      receive one or more instances of the first synchronization signal according to the transmission pattern for the first synchronization signal; and
      modify the established connection with the base station based at least in part on the received one or more instances of the first synchronization signal.

28. The apparatus of claim 27, wherein the instructions are further executable by the processor to cause the apparatus to:
   identify, based at least in part on the configuration for the transmission pattern, one or more parameters for the one or more instances of the first synchronization signal; and
   receive the one or more instances of the first synchronization signal according to the one or more parameters.

29. An apparatus for wireless communication at a base station, comprising:
   a processor,
   memory coupled with the processor; and
   instructions stored in the memory and executable by the processor to cause the apparatus to:
      establish a connection with a user equipment (UE) based at least in part on a synchronization signal block from the base station, wherein the synchronization signal block comprises at least a first synchronization signal;

identify a configuration for a transmission pattern for the first synchronization signal to be transmitted by the base station; and transmit one or more instances of the first synchronization signal according to the transmission pattern for the first synchronization signal.

30. The apparatus of claim 29, wherein the instructions are further executable by the processor to cause the apparatus to:

identify, based at least in part on the configuration for the transmission pattern, one or more parameters for the one or more instances of the first synchronization signal; and transmit the one or more instances of the first synchronization signal according to the one or more parameters.

* * * * *